(12) United States Patent
Imamura et al.

(10) Patent No.: US 7,628,511 B2
(45) Date of Patent: Dec. 8, 2009

(54) LIGHT SOURCE DEVICE

(75) Inventors: Atsushi Imamura, Himeji (JP); Kenichi Yoshida, Himeji (JP); Kazuhiro Goto, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 5 days.

(21) Appl. No.: 12/174,270

(22) Filed: Jul. 16, 2008

(65) Prior Publication Data

US 2009/0021941 A1   Jan. 22, 2009

(30) Foreign Application Priority Data

Jul. 17, 2007 (JP) .............................. 2007-186050
Oct. 18, 2007 (JP) .............................. 2007-270847

(51) Int. Cl.
*F21V 33/00* (2006.01)

(52) U.S. Cl. ..................................... 362/261

(58) Field of Classification Search .................. 362/261
See application file for complete search history.

(56) References Cited

U.S. PATENT DOCUMENTS 7,012,374 B2 * 3/2006 Kurimoto et al. ........... 313/637

2005/0213327 A1 * 9/2005 Kobayashi et al. .......... 362/261
2006/0232178 A1 * 10/2006 Setzer et al. ................ 313/113

FOREIGN PATENT DOCUMENTS

JP      2007-066742 A      3/2007

* cited by examiner

*Primary Examiner*—Laura Tso
(74) *Attorney, Agent, or Firm*—David S. Safran; Roberts Mlotkowski Safran & Cole, P.C.

(57) ABSTRACT

A light source device, including an alternating current high-pressure mercury lamp having a pair of electrodes opposite each other with a spherical light-emitting part having at least 0.15 mg/mm³ of mercury and halogen at $10^{-6}$ μmol/mm³ to $10^{-2}$ μmol/mm³, and cylindrical hermetically sealed parts extending from both ends of the light-emitting part. External leads protrude from the ends of the light-emitting part for receiving alternating current. A reflecting mirror having a concave reflecting part surrounds the light-emitting part and a cylindrical neck part. An adhesive for securing the mercury lamp and the reflecting mirror fills a periphery of the hermetically sealed parts of the mercury lamp. The distance L2 (mm) from a center in between the electrodes to the adhesive is set at a value of one of 16 mm or less and 20 mm or greater.

7 Claims, 15 Drawing Sheets

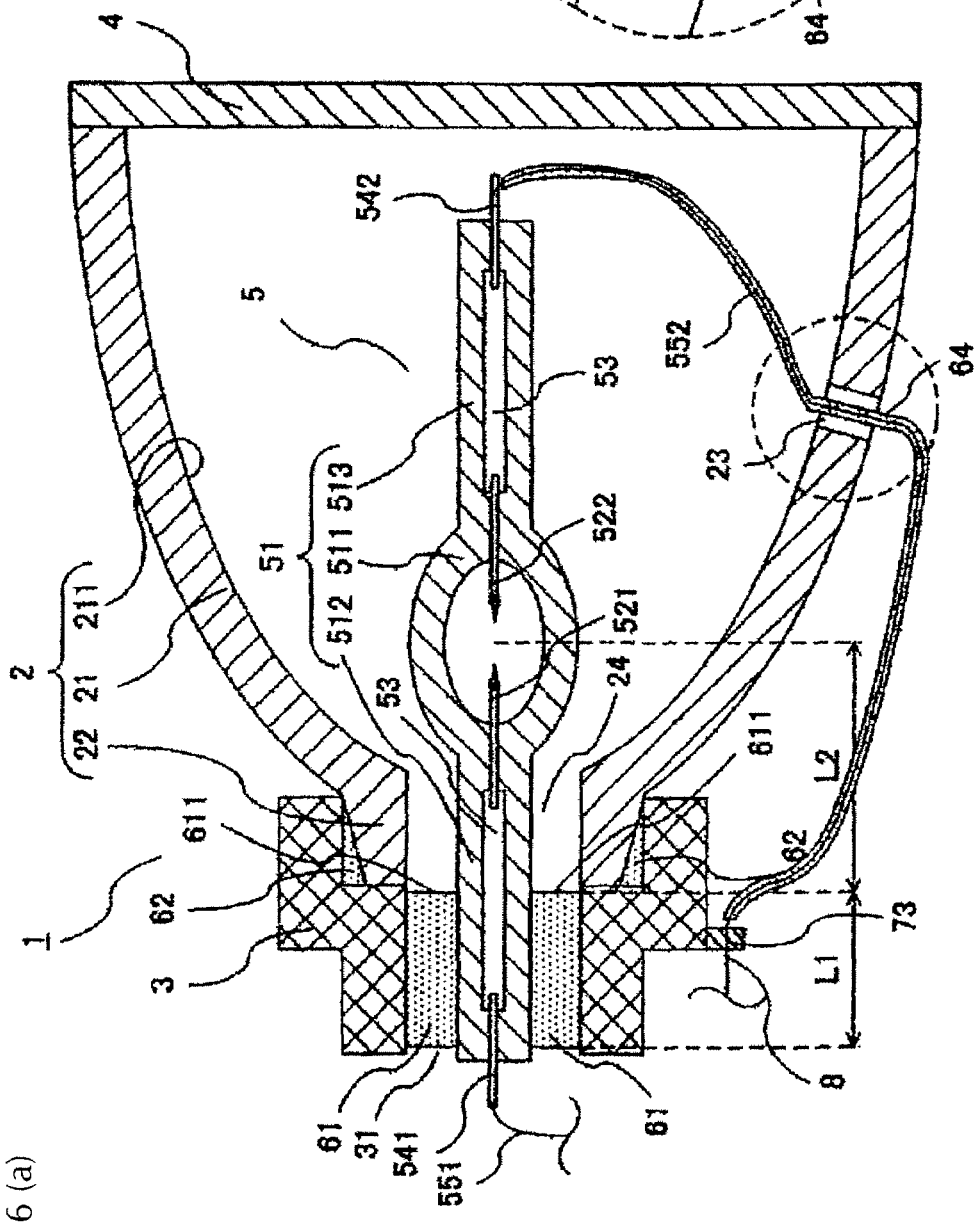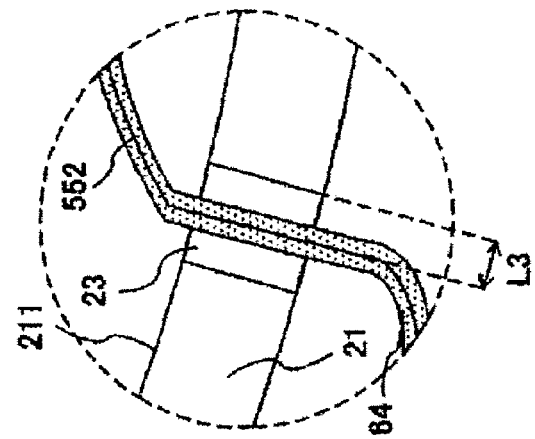

LIGHT SOURCE DEVICE

BACKGROUND OF THE INVENTION

1. Field of Invention

The present invention relates to a light source device used for a projector, and particularly a light source device where a light source is operated by alternating current.

2. Description of Related Art

As projector devices, a liquid crystal projector device and a DLP (Trademark by Texas Instruments) projector device are available. A high-pressure mercury lamp is used as a projection light source that is used in these projector devices. A combination of the high-pressure mercury lamp and a reflecting mirror is a light source device, and this light source device is incorporated into the projector device at the point of use.

FIG. 15 shows a conventional light source device 1 described in Japanese Laid-Open Patent Application No. 2007-066742 and which is a cross sectional view along a pair of opposing electrodes 521 and 522 of a high-pressure mercury lamp 5. The light source device 1 includes a reflecting mirror 2 having a concave reflecting surface 211, and the high-pressure mercury lamp 5 arranged so as to match the center between the electrodes 521, 522 with a first focal point of the reflecting surface 211.

The reflecting mirror 2 includes a reflecting part 21 having the reflecting surface 211 and a cylinder neck part 22. An opening 23 is provided in the reflecting part 22 for accommodating a feed wire 552, as further described. A tubular base member 3 makes contact with the end of the neck part 22 of the reflecting mirror 2, and an insertion opening 31 in the base member 3 is arranged in an insertion opening 24 of the neck part 22. A light exit plate 4 is arranged in an opening of the reflecting mirror 2 and so as to emit reflected light from the reflecting surface 211 of the reflecting mirror 2.

The high-pressure mercury lamp 5 includes a discharge tube 51 having a roughly spherical light-emitting part 511 and hermetically sealed parts 512 and 513 extending from ends of the light-emitting part 511. The electrodes 521 and 522 are included in the light-emitting part 511, with external leads 541 and 542 protruding from the hermetically sealed parts 512, 513, respectively, and with foils 53 that electrically connect the electrodes 521 and 522 with the external leads 541 and 542, respectively and that is embedded in the hermetically sealed parts 512, 513, respectively. The ends of the pair of electrodes 521 and 522 are arranged within the light-emitting tube 511 so as to oppose each other, and mercury is included as light-emitting metal.

The first hermetically sealed part 512 of the high-pressure mercury lamp 5 is inserted into the successive insertion openings 24 and 31 of the reflecting mirror 2 and the base member 3, and an adhesive 61 fills the space between the base member 3 and the first hermetically sealed part 512, so as to adhere the first hermetically sealed part 512 and the base member 3. In this way, the high-pressure mercury lamp 5 is secured to the reflecting mirror 2, and the second hermetically sealed part 513 is arranged so as to extend toward the light exit plate 4. The external lead 542 protrudes from the second hermetically sealed part 513, with the feed wire 552 connected to the external lead 542 and leading to the outside of the reflecting mirror 2 through the opening 23 of the reflecting part 21.

SUMMARY OF THE INVENTION

The present invention includes recognition that in a light source device equipped with an alternating current high-pressure mercury lamp, a problem exists where undesired noise is generated during initial use. This undesired noise from the light source device leaks to the outside of the projector for several minutes after the projector is started and can be heard by a user of the projector, and is an impediment to use of the projector. Thus, there is a need to control the volume of noise emitted from a light source device having a high-pressure mercury lamp, and which is powered by alternating current, during an initial period of operation of the light source device.

Accordingly, the above and other needs are addressed by a light source device of an exemplary embodiment including an alternating-current lighting type high-pressure mercury lamp, where a pair of electrodes are internally arranged opposite from each other, and includes a light-emitting part, where at least 0.15 mg/mm$^3$ of mercury and halogen within the range of 10$^{-6}$ μmol/mm$^3$ to 10$^{-2}$ μmol/mm$^3$ are provided, and with hermetically sealed parts extending from both ends of the light-emitting part. A reflecting mirror includes a reflecting part arranged so as to surround the light-emitting part and a cylinder neck part, and an adhesive for securing the mercury lamp and the reflecting mirror by filling the periphery of the hermetically sealed parts of the mercury lamp is provided. A distance L2 (mm) from the center between the electrodes to the adhesive is adjusted to 16 mm or less or 20 mm or greater.

In a further embodiment, the adhesive is fills in the neck part of the reflecting mirror, advantageously, controlling undesired noise from the high-pressure mercury lamp.

The light source device relating to a further embodiment can prevent the generation of undesired noise due to the abrasion of the reflecting mirror against the feed wire by having a cylinder-shaped base member linked to the neck part of the reflecting mirror, and with the adhesive filling in the base member. In further embodiments, this can also be achieved by providing an opening for a feed wire for the mercury lamp provided in a reflecting part of the reflecting mirror, and with the adhesive also filling in the opening, with a flexible tube interposed between the opening and the feed wire, and with a metal tube provided between the opening and the flexible tube.

BRIEF DESCRIPTION OF THE DRAWINGS

FIG. 6 is a diagram of a light source device relating to a further embodiment of the present invention;

DETAILED DESCRIPTION OF THE INVENTION

Figure 1:
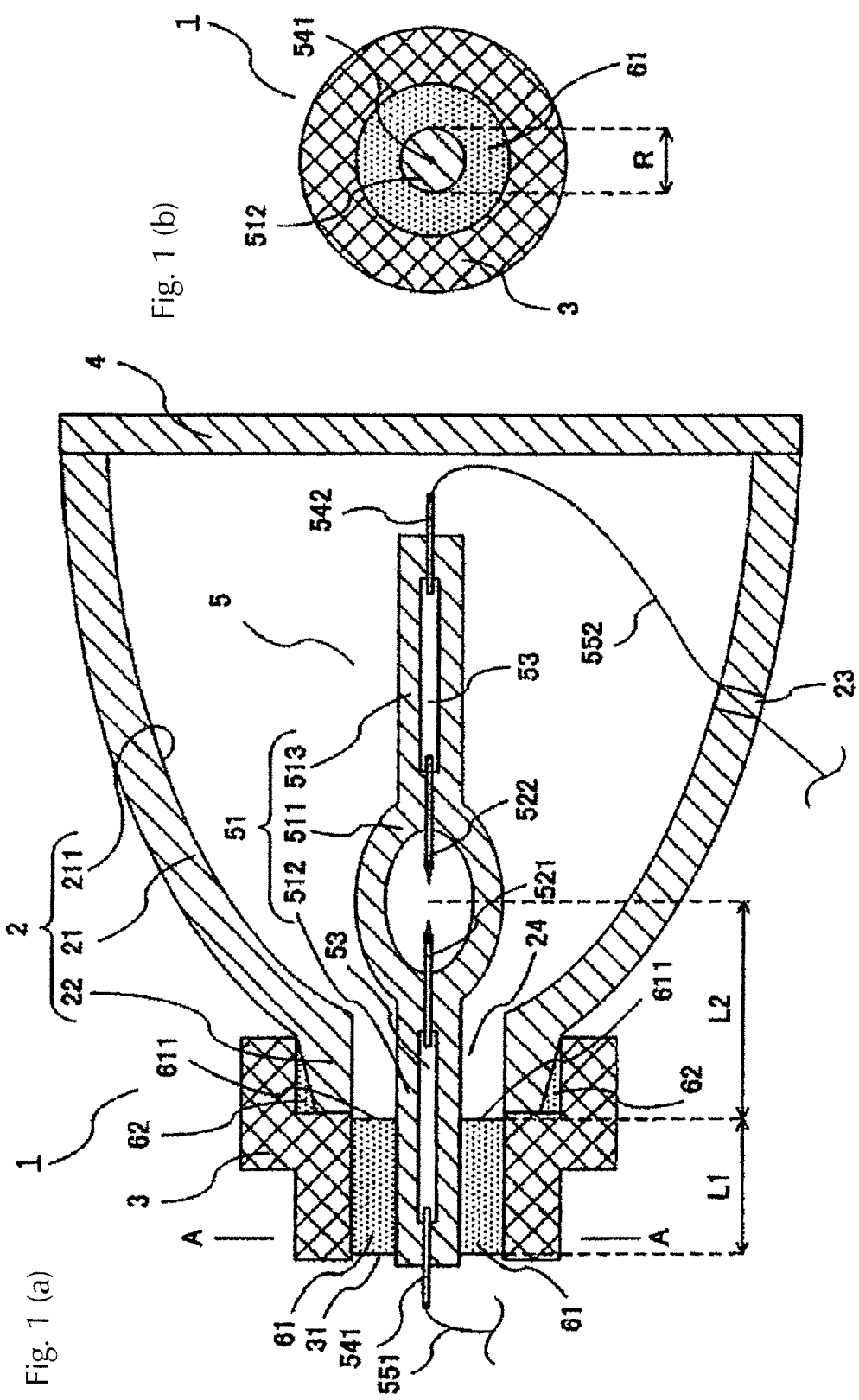
FIGS. 1(a)-1(b) are diagrams of a light source device relating to an embodiment of the present invention.

FIGS. 1(a)-1(b) are diagrams of a light source device 1 relating to the present invention. FIG. 1(a) is a cross sectional view along a pair of electrodes 521 and 522 of a high-pressure mercury lamp 5, and FIG. 1(b) is a cross sectional view along line A-A of FIG. 1(a) and vertical to a central axis direction of the first hermetically sealed part 512 in FIG. 1(a). In FIGS. 1(a)-1(b), the light source device 1 includes a reflecting mirror 2 having a concave reflecting surface 211 and a high-pressure mercury lamp 5, wherein a light-emitting part 511 is arranged so as to be surrounded by the concave reflecting surface 211.

The reflecting mirror 2 includes a reflecting part 21 having the concave reflecting surface 211 and a tubular neck part 22, and for example, formed with a heat-resisting glass material, such as borosilicate glass, or a metal material, such as aluminum or copper. The reflecting mirror 2 takes on a funnel shape, for example, by being machined from a metal material, and so as to integrate the reflecting part 21 and the neck part 22. An insertion opening 24 for inserting the high-pressure mercury lamp 5 is arranged in the reflecting mirror 2, so as to pass through the reflecting part 21 from the cylinder neck part 22. The reflecting mirror 2, the reflecting part 21 and the neck part 22 can be separate units and can be integrally formed, for example, by welding.

In the concave reflecting surface 211 of the reflecting part 21, a metal deposition film, such as aluminum or rhodium, or a dielectric multilayer film laminated with silica ($SiO_2$) and titania ($TiO_2$) is formed. In the case that the reflecting mirror 2 has the reflecting surface 211 formed from a metal material that can reflect desired light and has a metallic luster, the metal deposition film and the dielectric multilayer film need not be employed.

An opening 23 is arranged in the reflecting part 21 for feeding a feed wire 552 of the high-pressure mercury lamp 5 outside of the concave reflecting surface 211. When the reflecting mirror 2 is made of a metal material, an insulating tube (not shown), for example, made of alumina ($Al_2O_3$) is provided in the opening 23 of the reflecting part 21. Advantageously, undesired conduction between the reflecting mirror 2 and the feed wire 552 can be prevented.

A tubular base member 3 is arranged at the end of the neck part 22 of the reflecting mirror 2, so as to provide an insertion opening 31 of the tubular base member 3 and an insertion opening 24 of the reflecting mirror 2. The tubular base member 3 is made of a material having suitable heat resistance, such as a ceramic material, and is connected to the reflecting mirror 2 by adhesive 61.

A first hermetically sealed part 512 of the high-pressure mercury lamp 5, as will be further described, is arranged in the insertion opening 31 of the tubular base member 3. The adhesive 61 having suitable heat resistance, such as an inorganic adhesive, fills the space between the first hermetically sealed part 512 and the base member 3.

The high-pressure lamp 5 includes a discharge tube 51 including a roughly spherical light-emitting part 511 and the hermetically sealed parts 512 ad 513 extending from the ends of the light-emitting part 511, The pair of electrodes 521 and 522 is internally arranged opposing each other in the light-emitting part 511. In an exemplary embodiment, 0.15 mg/mm$^3$ of mercury are included within the light-emitting part 511, with external leads 541, 542 protruding from the ends of the hermetically sealed parts 512, 513, respectively, and with foils 53 embedded in the hermetically sealed parts 512, 513.

The discharge tube 51 is made of, for example, quartz glass. For example, bromine as halogen gas within the range of $10^{-6}$ μmol/mm$^3$ to $10^{-2}$ μmol/mm$^3$, and for example, 13 kPa of argon gas as rare gas are included within the light-emitting part 511 of the discharge tube 51, along with at least 0.15 mg/mm$^3$ of mercury. The pair of electrodes 521, 522 is made of, for example, tungsten and is arranged within the light-emitting part 511 with opposing ends thereof at a distance of 2 mm or less.

The hermetically sealed parts 512, 513 of the discharge tube 51 are formed so as to be cylindrical, for example, by fusing the inside of a tube body made of quartz glass extending from the both ends of the light-emitting part 511 with heat under reduced pressure. For example, they can be formed using a so called shrink sealing method. The metal foils 53, for example, made of molybdenum are embedded within the hermetically sealed parts 512, 513, so as to electrically connect the electrodes 521, 522 with the external leads 541 and 542, respectively, protruding from the ends of the hermetically sealed parts 512, 513.

The first hermetically sealed part 512 of the high-pressure mercury lamp 5 is arranged in the insertion opening 31 of the base member 3, and as shown in FIG. 1(b), the adhesive 61 is filled between the outer radial circumference of the cylindrical hermetically sealed parts 512, 513 and the inner circumference of the tubular base member 3. Advantageously, the high-pressure mercury lamp 5 is secured to the base member 3, and to the reflecting mirror 2 via the base member 3. The high-pressure mercury lamp 5 secured to the reflecting mirror 2 is arranged so as to have the other hermetically sealed part 513 extending toward the light exit plate 4, as will be further described. For the adhesive 61, for example, an inorganic adhesive having suitable heat resistance is preferably employed.

The feed wire 552, which protrudes from the second hermetically sealed part 513 of the high-pressure mercury lamp 5 and is connected to the second external lead 542, is provided through the concave reflecting surface 211 of the reflecting mirror 2 via the opening 23 of the reflecting mirror 2. The feed wires 551 and 552 connected to the high-pressure mercury lamp 5 are connected to a power source (not shown).

The concave reflecting surface 211 of the reflecting mirror 2 has a surface configuration where, for example, a spheroid is cut into one-half at the minor axis, and is arranged so as to match the center between the electrodes 521, 522 of the high-pressure mercury lamp 5, with the first focal point adjacent to the neck part 22. The reflecting part 21 of the reflecting mirror 2 has an opening in the direction toward the second focal point relative to the first focal point, and is arranged so as to cover the opening of the reflecting part 21 by the disc-shaped light exit plate 4 that emits desired light from the light source device 1.

The concave reflecting surface 211 of the reflecting mirror 2 also may be shaped like a paraboloid. In this case, the center between the electrodes 521, 522 of the high-pressure mercury lamp 5 is arranged so as to be matched with the focal point of the paraboloid-shaped reflecting surface 211.

The light exit plate 4 is, for example, made of borosilicate glass. The light exit plate 4 functions so as to protect from explosion, for example, when the high-pressure mercury lamp 5 develops a high pressure due to evaporated mercury when the lamp 5 is turned on and explodes. However, where the light source device 1 is used with a projector (not shown)

having an explosion protection function, the light exit plate 4 need not be employed for such function.

As shown in FIG. 1(*a*), the distance from the center of the electrodes 521, 522 to the end surface 611 of the adhesive 61 filling the space between the outer circumference of the out hermetically sealed part 512 and the inner circumference of the base member 3, at the side of the light-emitting part 511 in the direction where the hermetically sealed parts 512, 513 extend (i.e., central axis direction) is regarded as L2. In an exemplary embodiment, the light source device 1 is within the range of L2≦16 mm or L2≧20 mm.

During the initial period when the lamp 5 is turned on, direct-current electricity enters into the external leads 541 ad 542 of the high-pressure mercury lamp 5 for 5 seconds or so from a power source (not shown), and electric discharge occurs between the electrodes 521, 522. After the direct-current electricity, an alternating current then enters and electric discharge between the electrodes 521, 522 is continued. The electric discharge between the electrodes 521, 522 causes the radiation of light from the light-emitting part 511 of the high-pressure mercury lamp 5, and a portion of the radiated light travels toward the light exit plate 4. Light that does not travel toward the light exit plate 4 travels toward the reflecting surface 211, and such light is reflected by the reflecting surface 211 and travels toward the light exit plate 4. In this way, the light from the high-pressure mercury lamp 5 is transmitted through the light exit plate 4 and is radiated.

For example, the first electrode 521 is a starting point of the electric discharge at the time of entry of the direct current electricity, and in the meantime, both the first electrode 521 and the second electrode 522 alternately become starting points of electric discharge at the time of entry of alternating current. With this phenomenon, it can be considered that repetition of increase and decrease in temperature of the pair of electrodes 521, 522 at the time of entry of the alternating current causes the occurrence of pressure fluctuations, which cause the high-pressure mercury lamp 5 to vibrate. In particular, since it is in the middle of complete evaporation of mercury within the light-emitting part 511 during the initial period of turning on of the lamp 5 by alternating current, and consequently, it is believed that the vibration of the high-pressure mercury lamp 5 during the initial period of the turning on of the lamp 5 by alternating current is especially great. Accordingly, undesirable noise is generated from the light source device 1 due to the vibration of the high-pressure mercury lamp 5, when the lamp 5 is operated by alternating current.

With the light source device 1, as described above having L2≦16 mm or L2≧20 mm, advantageously, the volume of undesired noise emitted from the light source device 1 during the initial period of turning on the lamp 5 via alternating current can be controlled. For example, it is said that the audible range of humans is generally between 20 Hz to 20 kHz. Various devices, such as a cooling fan, are mounted in a projector (not shown) including the light source device 1. Accordingly, when the projector is operated, such devices generate operating noise. Since the volume of such operation noise of such devices can be great at 8 kHz to 12 kHz, if the volume of the operation noise at frequency of 8 kHz to 12 kHz at the time of turning on the lamp 5 of the light source device 1 also is great, a user of the projector sometimes hears the undesirable operation noise when the lamp 5 of the light source 1 is turned on, as further described.

Advantageously, when the distance from the center of the electrodes 521, 522 to the end surface 611 of the adhesive 61 at the side of the light-emitting part 511 filled between the outer circumference of the hermetically sealed part 512 and the inner circumference of the base member 3 in the direction where the hermetically sealed parts 512, 513 extend (i.e., the central axis direction) is given as L2, if the range is L2≦16 mm or L2≧20 mm, as shown in the experiments described below, the peak frequency at the time of turning on the lamp 5 of the light source device 1 can be adjusted to 12 kHz or greater or 8 kHz or lower. In this way, the operation noise of the light source device 1 can be adjusted to a frequency that is not offensive to the user of the projector. In addition, the adjustment of the operation noise of the light source device 1 to the same frequency as the operation noise of the other devices, such as fans, and the like, advantageously, masks the undesired noise of the light source device 1 for the user of the projector.

In particular, the adjustment of the distance L2 from the center between the electrodes 521, 522 to the adhesive 61 in the direction of a pair of the electrodes 521, 522 to 14 mm or less enables the increase of the peak frequency to 20 kHz or greater. The frequency 20 kHz is out of the human's audible range, and thus the generated noise does not generate undesirable noise to the user of the projector.

Figure 2:
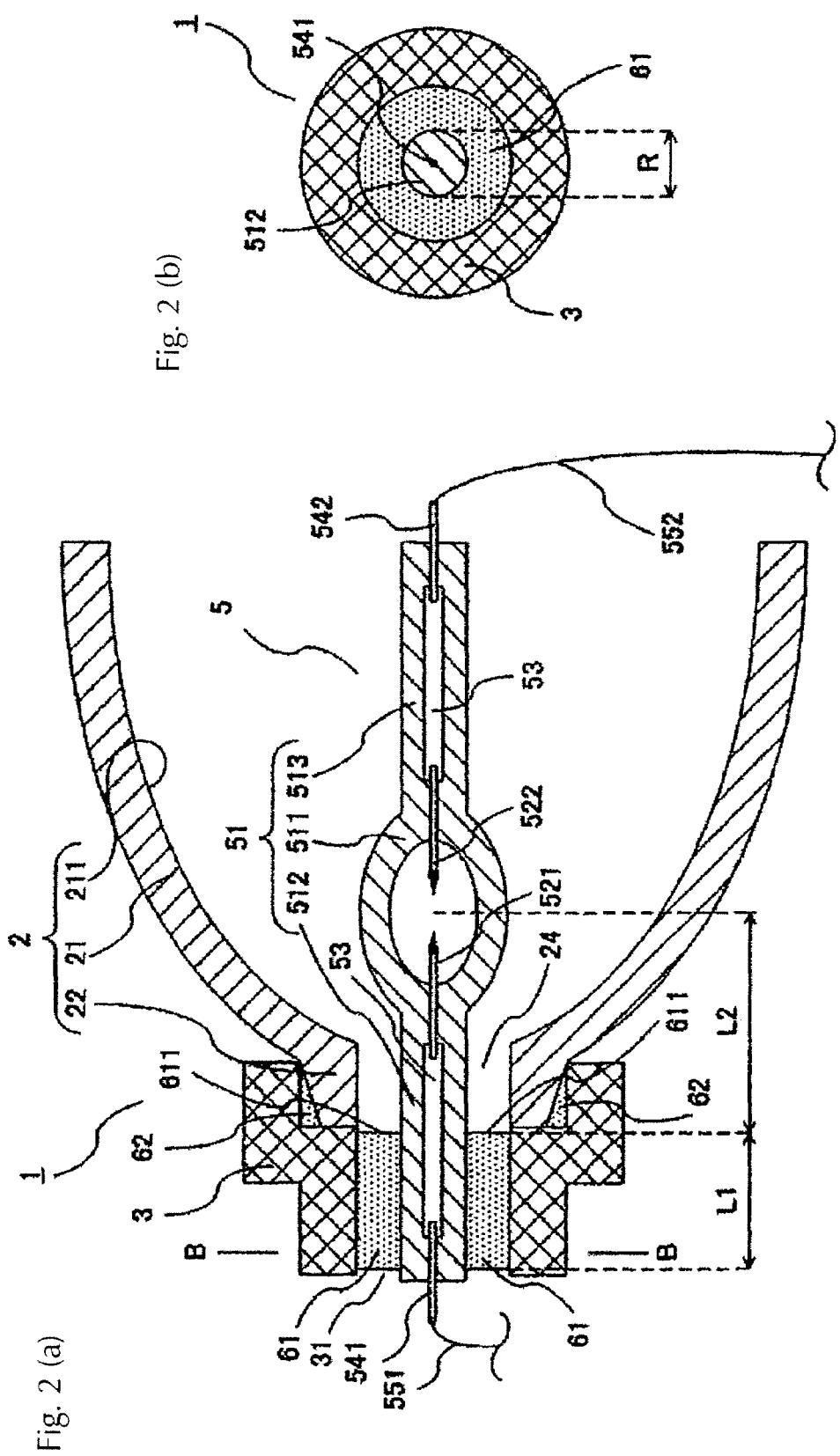
FIGS. 2(a)-2(b) are diagrams of a light source device relating to a further embodiment of the present invention.

FIGS. 2(*a*)-2(*b*) are diagrams of the light source device 1 relating to another embodiment of the present invention. FIG. 2(*a*) is a cross sectional view along the pair of electrodes 521, 522 of the high-pressure mercury lamp 5, and FIG. 2(*b*) is a cross sectional view along line B-B vertical to the central axis direction of the first hermetically sealed part 512 in FIG. 2(*a*). The light source device 1 of FIGS. 2(*a*)-2(*b*) operates in a similar manner as that of FIGS. 1(*a*)-1(*b*) and accordingly only the differences therebetween will be further described for the sake of brevity.

Specifically, the light source device 1 shown in FIGS. 2(*a*)-2(*b*) need not employ a light exit plate 4 or an opening 23 in the reflecting part 21. In addition, securing the first hermetically sealed part 512 of the high-pressure mercury lamp 5 to the base member 3 causes the arrangement of the second hermetically sealed part 513 so as to extend toward the opening of the reflecting part 21. The feed wire 552 is electrically connected to the second external lead 542 protruding from the second hermetically sealed part 513. The feed wire 552 is sent to the outside of light source device 1 via the opening in the reflecting part 21, and is connected to a power source (not shown).

The light source device 1 shown in FIGS. 2(*a*)-2(*b*) can achieve similar advantages as that of FIGS. 1(*a*)-1(*b*), wherein the distance L2 from the center of the electrodes 521, 522 to the end surface 611 of the adhesive 61 at the side of the light-emitting part 511 provided between the outer circumference of the first hermetically sealed part 512 and the inner circumference of the base member 3 in the direction where the hermetically sealed parts 512, 513 extend (i.e., the central axis direction) is adjusted to be 16 mm or less or 20 mm or greater. Further, when the distance L2 from the center of the electrodes 521, 522 to the surface 611 of the adhesive 61 at the side of the light-emitting part 511 provided between the outer circumference of the hermetically sealed part 512 and the base member 3 in the direction where the hermetically sealed parts 512, 513 extend (i.e., central axis direction) is 14 mm or less, similar advantages as with the light source device 1 of FIGS. 1(*a*)-1(*b*) can be obtained.

Figure 3:
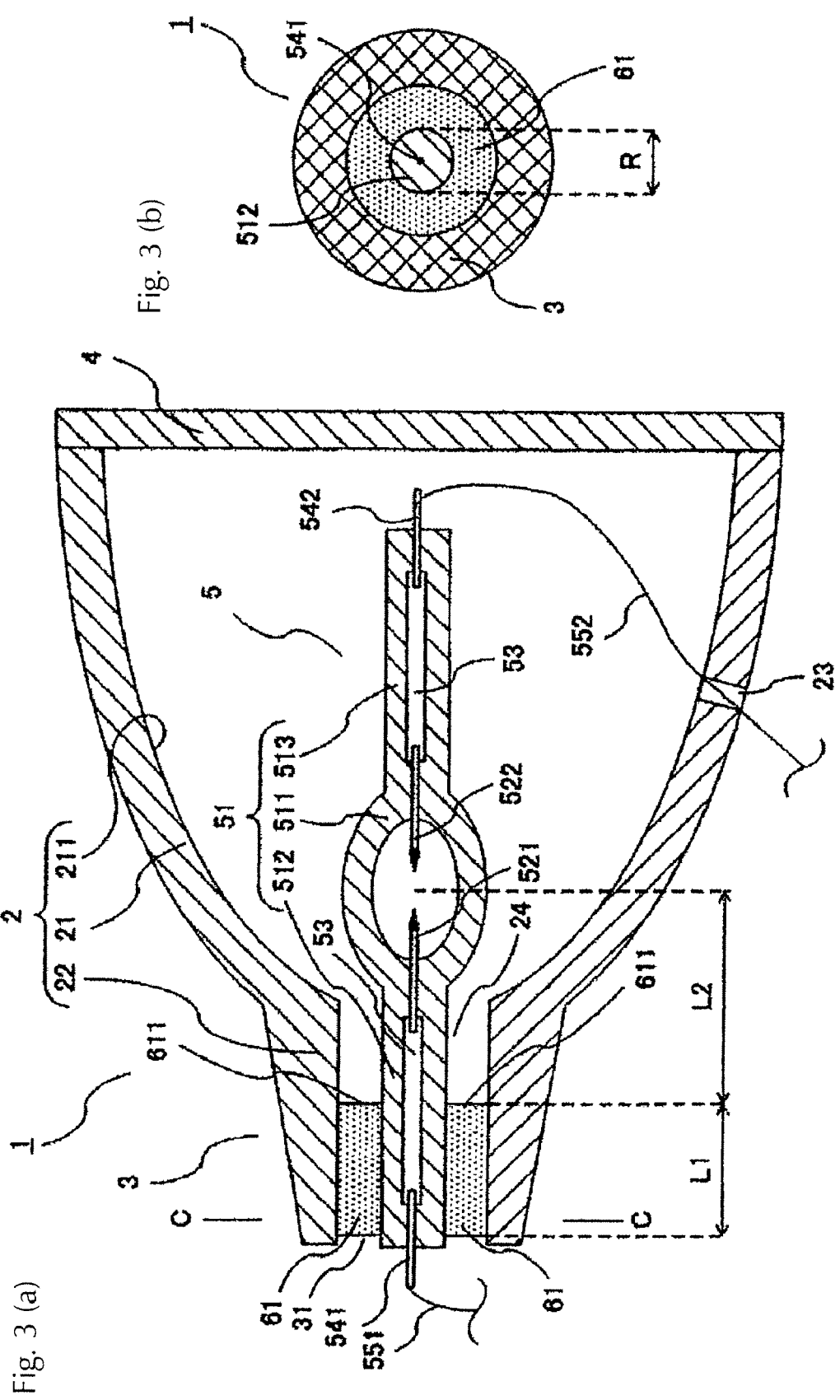
FIGS. 3(a)-3(b) are diagrams of a light source device relating to a further embodiment of the present invention.

FIGS. 3(*a*)-3(*b*) are diagrams of the light source device 1 according to another embodiment. FIG. 3(*a*) is a cross sectional view along a pair of the electrodes 521, 522 of the high-pressure mercury lamp 5, and FIG. 3(*b*) is a cross sectional view along line C-C vertical to the central axis direction of the first hermetically sealed part 512. The light source device 1 of FIGS. 3(*a*)-3(*b*) operates in a similar manner as that of FIGS. 1(a)-1(b) and accordingly only the differences therebetween will be further described for the sake of brevity.

Specifically, the light source device 1 shown in FIGS. 3(a)-3(b) need not employ a tubular base member 3, and the first hermetically sealed part 512 of the high-pressure mercury lamp 5 is secured to the neck part 22 of the reflecting mirror 2. In addition, the first hermetically sealed part 512 of the high-pressure mercury lamp 5 is inserted into the insertion opening 24 of the reflecting mirror 2, and is arranged toward the tubular neck part 22 of the reflecting mirror 2. The adhesive 61 fills the space between the outer circumference of the cylindrical hermetically sealed part 512 and the inner circumference of the neck part 22 of the reflecting mirror 2, and the high-pressure mercury lamp 5 is secured to the reflecting mirror 2 therewith.

In the light source device 1, the distance from the center between the hermetically sealed parts 512, 513 to the end surface of the adhesive 61 filling the space between the outer circumference of the first hermetically sealed part 512 and the inner circumference of the neck part 21 of the reflecting mirror 2 is given as L2. The light source device 1 shown in FIGS. 3(a)-3(b) can achieve similar advantages as that of FIGS. 1(a)-1(b) by adjusting the distance L2 from the center between the electrodes 521, 522 to the end surface 611 of the adhesive 61 provided between the outer circumference of the first hermetically sealed part 512 to the inner circumference of the neck part 21 of the reflecting part 21 in the direction where the hermetically sealed parts 512, 513 extend (i.e., the central axis direction) to be 16 mm or less or 20 mm or greater. Further, when the distance L2 from the center of the electrodes 521, 522 to the surface 611 of the adhesive 61 at the side of the light-emitting part 511 provided between the outer circumference of the hermetically sealed part 512 and the inner circumference of the neck part 21 of the reflecting mirror 2 in the direction where the hermetically sealed parts 512, 513 extend (i.e., the central axis direction) is adjusted to 14 mm or less, similar advantages as with the light source device 1 of FIGS. 1(a)-1(b) can be obtained. Moreover, the light source device of FIGS. 3(a)-3(b) can achieve similar advantages as with the light source device 1 of FIGS. 1(a)-1(b), by employing the opening 23 in the reflecting part 21 and the light exit plate 4.

Figure 4:
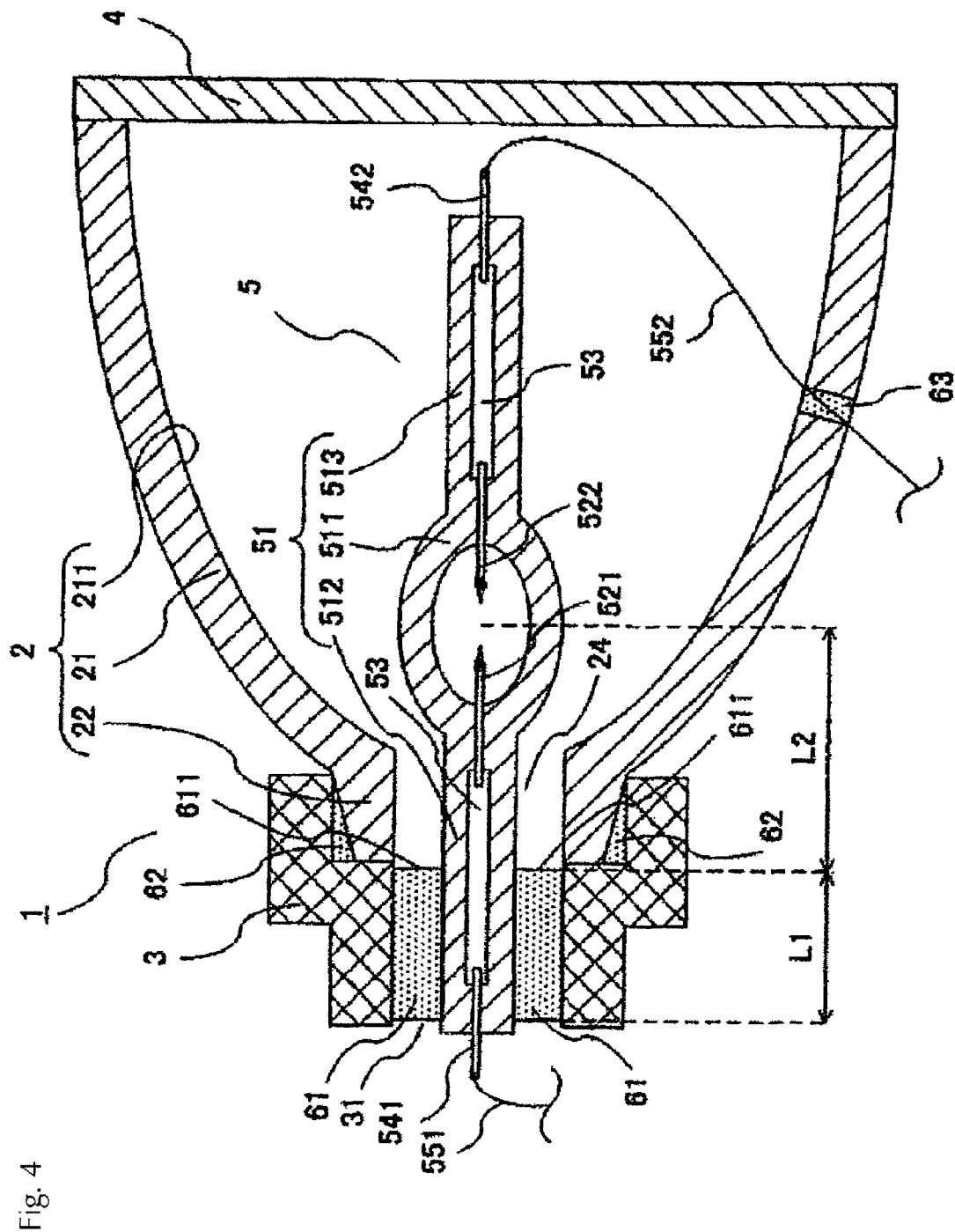
FIG. 4 is a diagram of a light source device relating to a further embodiment of the present invention.

FIG. 4 is a diagram of the light source device 1 according to another embodiment. In FIG. 4, a cross sectional view along the pair of electrodes 521, 522 of the high-pressure mercury lamp 5 is shown. The light source device 1 of FIG. 4 operates in a similar manner as that of FIGS. 1(a)-1(b) and accordingly only the differences therebetween will be further described for the sake of brevity.

Specifically, the light source device 1 shown in FIG. 4 employs an adhesive 63 to fill in the opening 23. In addition, the first hermetically sealed part 512 of the high-pressure mercury lamp 5 is directly secured to the reflecting mirror 2, and the second hermetically sealed part 513 is indirectly secured to the reflecting mirror 2 via the first hermetically sealed part 512. Advantageously, at the time of turning on the lamp 5 via alternating current, when the high-pressure mercury lamp 5 vibrates, because the first hermetically sealed part 512 is directly secured to the reflecting mirror 2, such vibrations can be restrained and made relatively small. However, because the second hermetically sealed part 513 is indirectly secured to the reflecting mirror 2, it is difficult to restrain the vibrations, which can increase, causing the feed wire 552 connected to the second external lead 542 protruding from the second hermetically sealed part 513 to vibrate, so that the reflecting mirror 2 around the opening 23 and the feed wire 552 can abrade, causing the generation of a noise. Accordingly, the feed wire 552 is directly secured to the reflecting mirror 2 by filling the opening 23 with the adhesive 63, such as an inorganic adhesive, having suitable heat resistance. Advantageously, this prevents the feed wire 552 from abrading the reflecting mirror 2, and undesirable noise for the light source device 1 can be prevented.

Figure 5:
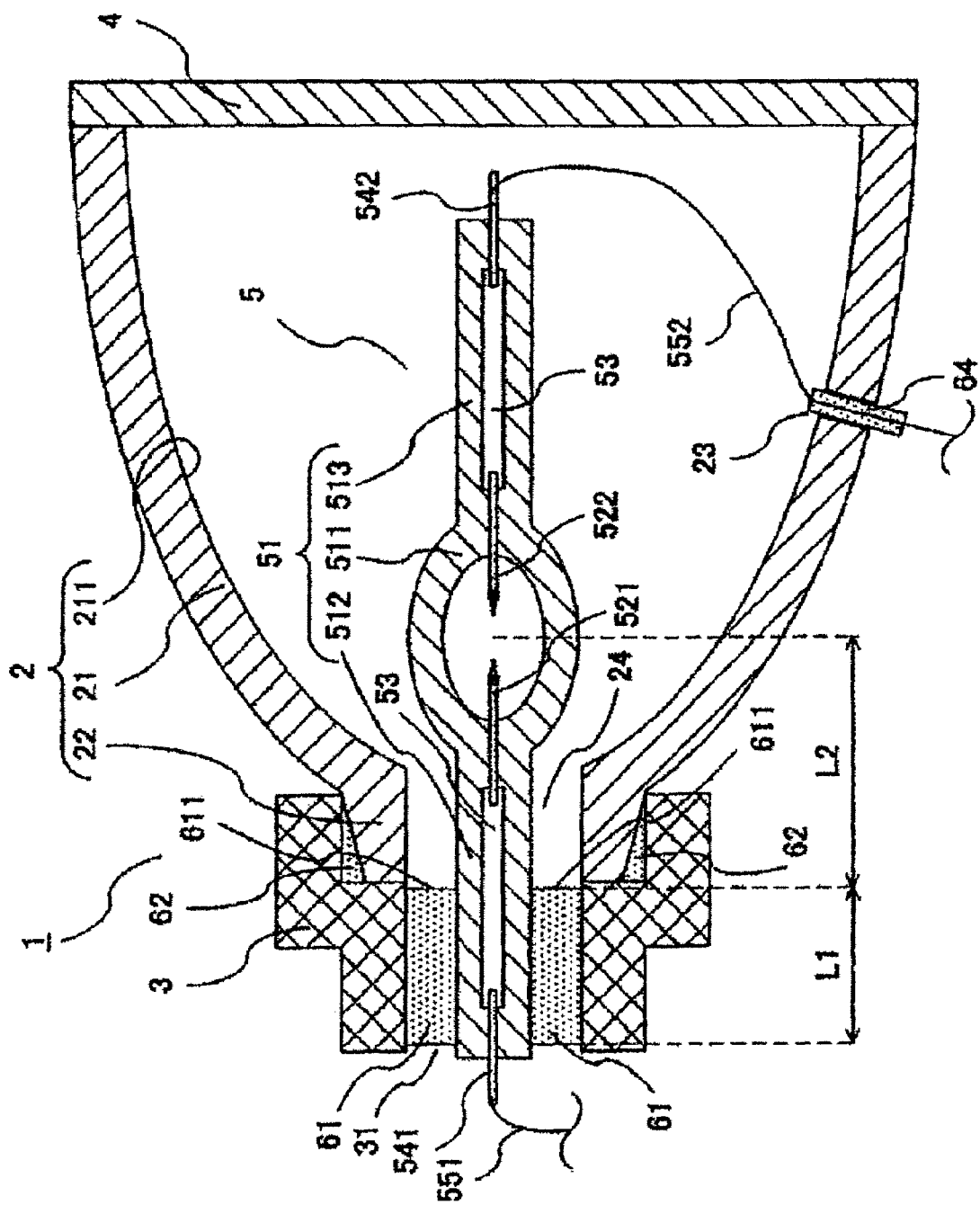
FIG. 5 is a diagram of a light source device relating to a further embodiment of the present invention.

FIG. 5 is a diagram of the light source device 1 according to another embodiment. In FIG. 5, a cross sectional view along the pair of electrodes 521, 522 of the high-pressure mercury lamp 5 is shown. The light source device 1 of FIG. 5 operates in a similar manner as that of FIGS. 1(a)-1(b) and accordingly only the differences therebetween will be further described for the sake of brevity.

Specifically, the light source device 1 shown in FIG. 5 includes a flexible tube 64 arranged around the feed wire 552, such that the reflecting mirror 2 and the feed wire 552 do not make contact with each other. In addition, the tube 64 has greater flexibility than the reflecting part 21 and the feed wire 552, and is provided around the feed wire 552 via the opening 23 of the reflecting mirror 2. The flexible tube 64 arranged on the feed wire 552 can be provided by heat-shrinking a heat-shrinkable tube, with the feed wire 552 inserted therein, at the position interposed between the opening 23 and the feed wire 552. In a further embodiment, the flexible tube 64 can also be provided by coating and drying an adhesive onto the feed wire 552 so as to interpose between the opening 23 and the feed wire 552. In addition, the flexible tube 64 can be formed to be in tube-shape by wiring a film member so as to coat the feed wire 552 at the position to be interposed between the opening 23 and the feed wire 552, and the tube 64 may be provided by securing the both ends with an adhesive.

The flexible tube 64 makes contact with the reflecting mirror 2 at the time of turning on the lamp 5 via alternating current by interposing the flexible tube 64 between the opening 23 and the feed wire 552. At the time of turning on the lamp 5, even if the vibration of the second hermetically sealed part 513 of the high-pressure mercury lamp 5 is transmitted to the feed wire 552, because the tube 64 has flexibility, the tube 64 absorbs the vibrations and the transmission of the vibrations to the reflecting mirror can be controlled. The flexible tube 64 can be made from a material having suitable heat resistance, such as fluorine resin, silicon resin, polyimide resin and epoxy resin, and which can withstand heat radiated from the high-pressure mercury lamp 5.

As shown in FIG. 5, even if there is a gap between the reflecting mirror 2 and the flexible tube 64, and the reflecting mirror 2 and the flexible tube 64 abrade against each other, if the flexible tube 64 is, for example, made from a material with a small coefficient of friction, such as fluorine resin, the friction between the reflecting mirror 2 and the flexible tube 64 decreases, and the generation of a noise can be further prevented.

In addition, even if the gap between the feed wire 552 and the reflecting mirror 2 situated in the radial direction is tightly filled with the flexible tube 64, such that the reflecting mirror 2 and the flexible tube 64 are closely attached so as not to abrade the reflecting mirror 2 against the feed wire 552, the vibration of the feed wire 552 of the high-pressure mercury lamp 5 can be absorbed by the flexibility of the tube 64.

FIGS. 6(a)-6(b) are diagrams of the light source device 1 according to a further embodiment. FIG. 6(a) is a cross sectional view along the pair of electrodes 521, 522 of the high-pressure mercury lamp 5. FIG. 6(b) is an enlarged view showing the periphery of the opening 23 of the light source device 1. The light source device 1 of FIGS. 6(a)-6(b) operates in a similar manner as that of FIGS. 1(a)-1(b) and FIG. 5 and accordingly only the differences therebetween will be further described for the sake of brevity.

Specifically, the light source device 1 shown in FIGS. 6(*a*)-6(*b*) is different from that of FIG. 5, wherein a metal terminal 73 is provided in the base member 3 and the flexible tube 64 surrounds the entire length of the feed wire 552. In addition, an electric connection is realized by crimping the feed wire 552 and a feed wire 8 extending from a power source (not shown) via a metal terminal 73. The metal terminal 73 is secured to the base member 3, for example, by an adhesive (not shown). A hole (not shown) is provided before the crimping, and the feed wire 552 extending from the second external lead 542 of the high-pressure mercury lamp 5 is inserted into the hole, and the feed wire 8 extending from the power source is also inserted. The metal terminal 73 is crimped such that the feed wire 552 extending from the second external lead 542 and the feed wire 8 extending from the power source are inserted, and the second external lead 542 and the power source are electrically connected.

The flexible tube 64 is provided, roughly throughout the entire length of the feed wire 552 by inserting the feed wire 552 into the flexible tube 64. The feed wire 552 is coated with the flexible tube 64 and is inserted into the metal terminal 73 through the opening 23 of the reflecting mirror 2. In the feed wire 552, however, the portion to be inserted into the metal terminal 73 is not coated with the flexible tube 64, and is exposed. Accordingly, the feed wire 552 and the feed wire 8 extending from power source are electrically connected directly or via the metal terminal 73 by crimping the metal terminal 73.

Even if the flexible tube 64 is not secured to the feed wire 552, the movement is restricted by the second external lead 542 connected to the feed wire 552 and the metal terminal 73 because the flexible tube 64 is established roughly throughout the entire length of the feed wire 552. Accordingly, providing the flexible tube 64 roughly throughout the entire length of the feed wire 552 extending from the second external lead 542 to the metal terminal 73 enables the constant interposition of the flexible tube 64 between the opening 23 and the feed wire 552.

As with other embodiments, the flexible tube 64 can be formed via heat-shrinking, adhesive, coatings, etc., so as to be interposed between the opening 23 and the feed wire 552. In addition, the flexible tube 64 can be formed to be in tube-state by winding a film-state member so as to coat the feed wire 552 at the position to be interposed between the opening 23 and the feed wire 552, so that the flexible tube 64 is completed by securing the ends thereof with an adhesive.

The flexible tube 64 makes contact with the reflecting mirror 2 at the time of turning on the lamp 5 via alternating current by interposing the flexible tube 64 between the opening 23 and the feed wire 552. At the time of turning on the lamp 5, even if the vibrations of the second hermetically sealed part 513 of the high-pressure mercury lamp 5 are transmitted to the feed wire 552, because the tube 64 has flexibility, the vibrations are absorbed, and the transmission of the vibration to the reflecting mirror 2 can be controlled. The flexible tube 64 can be made from a material, such as fluorine resin, silicon resin, polyimide resin and epoxy resin, and having heat suitable resistance and that can withstand the heat radiated from the high-pressure mercury lamp 5.

In addition, even if there is a gap between the reflecting mirror 2 and the flexible tube 64, as shown in FIG. 6(*b*), and the flexible tube 64 abrades against the reflecting mirror 2, as long as the flexible tube 64 is made of a material having a small coefficient of friction, such as a tube made of fluorine resin, the friction between the reflecting mirror 2 and the flexible tube 64 becomes smaller and the generation of a noise can be further prevented. Further, even if the gap between the feed wire 552 and the reflecting mirror 2 situated in the radial direction is occupied by the flexible tube 64, and the reflecting mirror 2 is closely attached to the flexible tube 64 so as not to abrade the feed wire 552 against the reflecting mirror 2, the vibration of the second hermetically sealed part 513 of the high-pressure mercury lamp 5 can be absorbed due to the flexibility of the tube 64.

Figure 7:
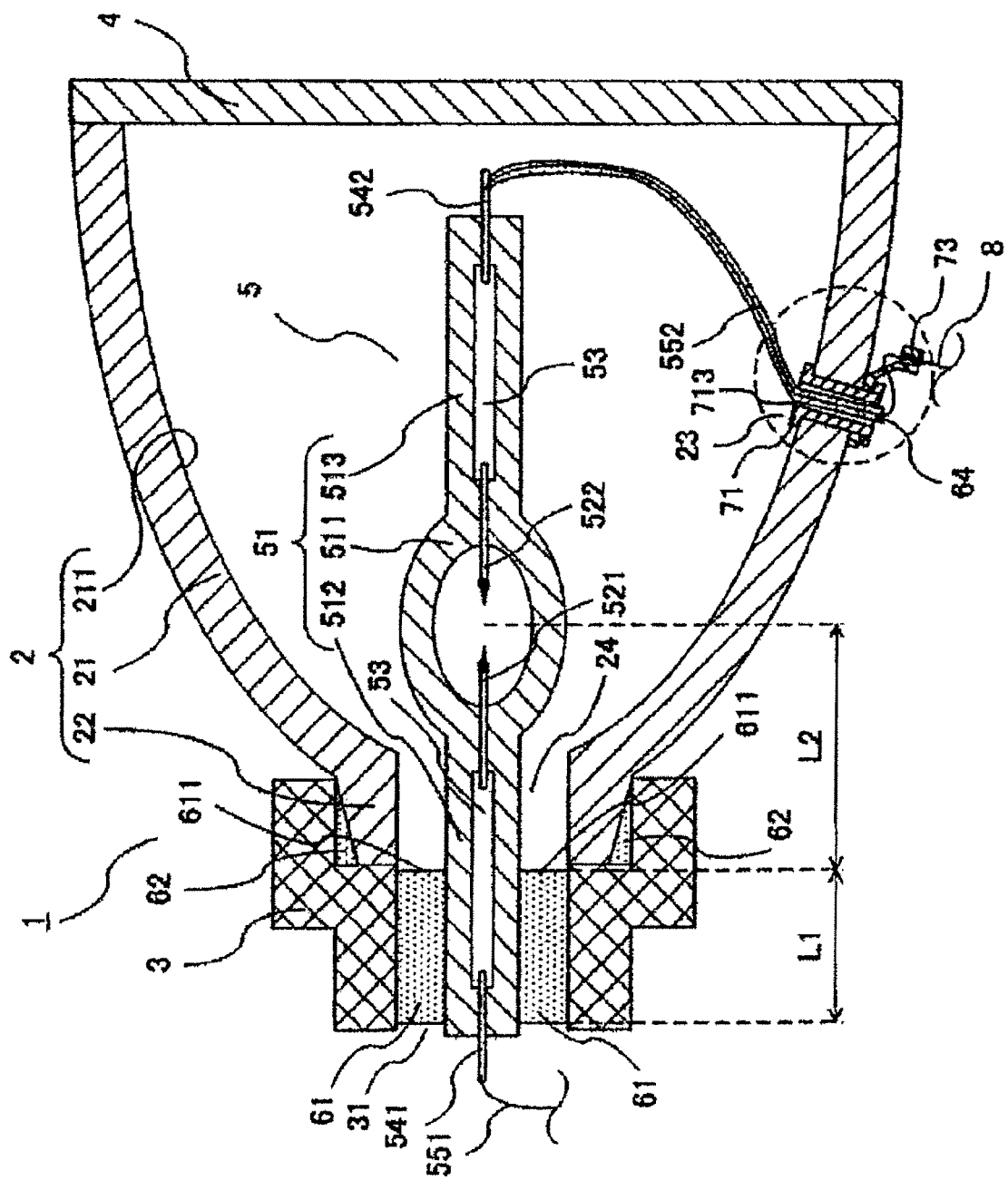
FIG. 7 is a diagram of a light source device relating to a further embodiment of the present invention.
Figure 8:
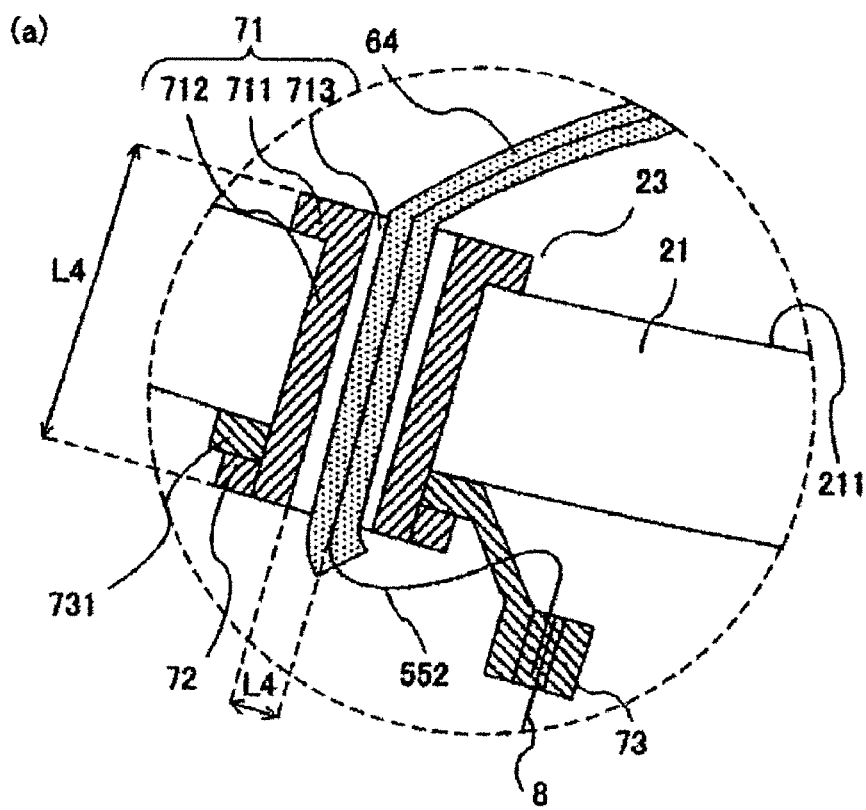
FIGS. 8(a)-8(b) are diagrams of a light source device relating to a further embodiment of the present invention.
Figure 8:
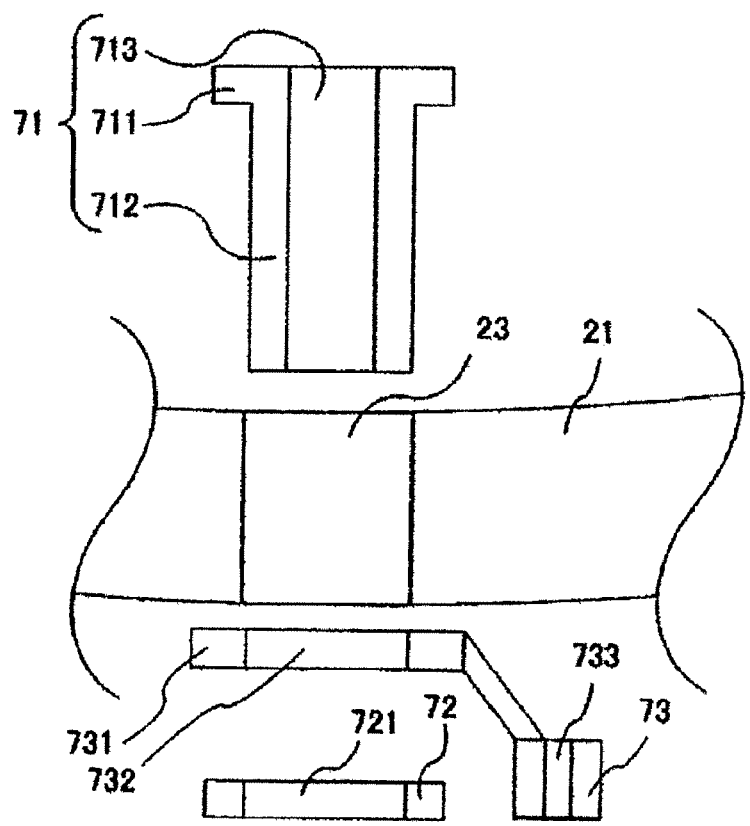

FIGS. 7 and 8(*a*)-8(*b*) are diagrams of the light source device 1 according to a further embodiment. FIG. 7 is a cross sectional view along the pair of electrodes 521, 522 of the high-pressure mercury lamp 5. FIG. 8(*a*) is an enlarged of the periphery of the opening 23 of the light source device 1 of FIG. 7. FIG. 8(*b*) is an enlarged view of an assembly means for assembling a rimmed metal tube or grommet 71 provided in the opening 23, and the metal terminal 73, wherein the rimmed metal tube or grommet 71 and the metal terminal 73 are separated from the opening 23, and with the feed wire 552 not shown. The light source device 1 of FIGS. 7 and 8(*a*)-8(*b*) operates in a similar manner as that of FIGS. 1(*a*)-1(*b*) and FIG. 6 and accordingly only the differences therebetween will be further described for the sake of brevity.

Specifically, the metal terminal 73 is provided in the opening 23 of the reflecting mirror 2 using the rimmed metal tube or grommet 71. The reflecting mirror 2 is formed, for example, with a heat-resistant glass material, such as borosilicate glass, and the metal terminal 73 is secured to the reflecting mirror 2 by the rimmed metal tube or grommet 71 and a washer 72.

As shown in FIG. 8(*a*), the rimmed metal tube or grommet 71 is provided in the opening 23 of the reflecting mirror 2. The rimmed metal tube or grommet 71 can be a cylindrical tube 712 provided in the opening 23 of the reflecting mirror 2 and include a rim 711 that is provided at one end of the cylindrical tube 712, an having an outer circumferential surface whose diameter is greater than the outer circumferential diameter of the cylindrical tube 712. The rimmed metal tube or grommet 71 has an opening 713 extending towards the central axis thereof.

In the rimmed metal tube 71, the rim 711 comes into contact with the reflecting surface 211 of the reflecting mirror 2. The other end (i.e., the end opposite from the side where the rim 711 is provided) of the tube 712 of the rimmed metal tube 71 is inserted into a center hole 732 of a ring-state fixture 731 of the metal terminal 73, and the hole 721 of the washer 72. Since the rimmed metal tube 71 and the washer 72 are secured, the fixture 731 extending from the metal terminal 73 is sandwiched between the reflecting mirror 2 and the washer 72.

The feed wire 552 passing through the opening 713 for penetrating the rimmed metal tube 71 provided in the opening 23 of the reflecting mirror 2 is inserted into a hole 733 shown in FIG. 8(*b*) of the metal terminal 73, which is secured to the reflecting mirror 2. The feed wire 8 extending from the power source (not shown) is also inserted and crimped. With this design, in the metal terminal 73, the second feed wire 552 extending from the second external lead 542 and the feed wire 8 extending from the power source are secured and electrically connected.

The assembly of the rimmed metal tube 71, the metal terminal 73 and the washer 72 is now explained with reference to FIG. 8(*b*). In FIG. 8(*b*), the tube 712 of the rimmed metal tube 71 is inserted toward the opening 23 from the side of the reflecting surface 211 of the reflecting mirror 2. After the insertion, the rim 711 of the rimmed metal tube 71 comes into contact with the reflecting surface 211 of the reflecting mirror 2. One end (i.e., the end opposite from the rim 711) of the tube 712 of the rimmed metal tube 71 protrudes from the opening 23 of the reflecting mirror 2. The protruding portion of the tube 712 is inserted into the hole 732 of the fixture 731 extending from the metal terminal 73, and is further inserted into the hole 721 of the washer 72. The washer 72 is secured to the rimmed metal tube 71 by being crushed with a suitable jig, and the fixture 731 and the metal terminal 73 are supported by the washer 72, and the rimmed metal tube 71.

The feed wire 552 extending from the second external lead 542 is inserted into the metal terminal 73 supported by the rimmed metal tube 71. The flexible tube 64 is provided roughly throughout the entire length of the feed wire 552 by inserting the feed wire 552 into the flexible tube 64. The feed wire 552 coated with the flexible tube 64 is inserted into the metal terminal 73 through the opening 23 of the reflecting mirror 2. In the feed wire 552, however, the portion inserted into the metal terminal 73 is not coated with the flexible tube 64, and is exposed. Accordingly, the feed wire 552 and the feed wire 8 extending from the power source are electrically connected directly or via the metal terminal 73 by crimping to the metal terminal 73.

Even if the flexible tube 64 is not secured to the feed wire 552, the movement is restricted by the second external lead 542 connected to the feed wire 552 and the metal terminal 73, because the flexible tube 64 is established roughly throughout the entire length of the feed wire 552. Accordingly, as shown in FIG. 7, the establishment of the flexible tube 64 roughly throughout the entire length of the feed wire 552 extending from the second external lead 542 to the metal terminal 73, enables the consistent interposition of the flexible tube 64 between the opening 23 (i.e., the opening 713 of the rimmed metal tube 71) and the feed wire 552.

As with other embodiments, the flexible tube 64 can be formed via heat-shrinking, adhesive, coatings, etc., so as to be interposed between the opening 23 and the feed wire 552. In addition, the flexible tube 64 can be formed to be in tube-state by winding a film-state member so as to coat the feed wire 552 at the position to be interposed between the opening 23 and the feed wire 552, so that the flexible tube 64 is completed by securing the ends thereof with an adhesive.

The flexible tube 64 makes contact with the reflecting mirror 2 at the time of turning on the lamp 5 via alternating current by interposing the flexible tube 64 between the opening 23 and the second feed wirer 552. At the time of turning on the lamp 5, even if the vibrations of the second hermetically sealed part 513 in the high-pressure mercury lamp 5 are transmitted to the feed wire 552, because the tube 64 has flexibility, the vibrations are absorbed, and the transmission of the vibrations to the reflecting mirror 2 can be controlled. The flexible tube 64 can be made from a material, such as fluorine resin, silicon resin, polyimide resin and epoxy resin, and having suitable heat resistance, and which can withstand the heat radiated from the high-pressure mercury lamp 5.

As shown in FIG. 8(a), even if there is a gap between the reflecting mirror 2 and the flexible tube 64 and the flexible tube 64 abrades against the reflecting mirror 2, if the flexible tube 64 is, for example, made from a material with a small coefficient of friction, such as fluorine resin, the friction between the reflecting mirror 2 and this flexible tube 64 becomes smaller, and the generation of a noise can be further prevented. In addition, even if the gap between the feed wire 552 and the reflecting mirror 2 situated in the radial direction is tightly filled with the flexible tube 64 and the reflecting mirror 2 and the flexible tube 64 are closely attached so as not to abrade the feed wire 552 against the reflecting mirror 2, the vibration of the feed wire 552 of the high-pressure mercury lamp 5 can be absorbed by the flexibility of the tube 64.

Figure 9:
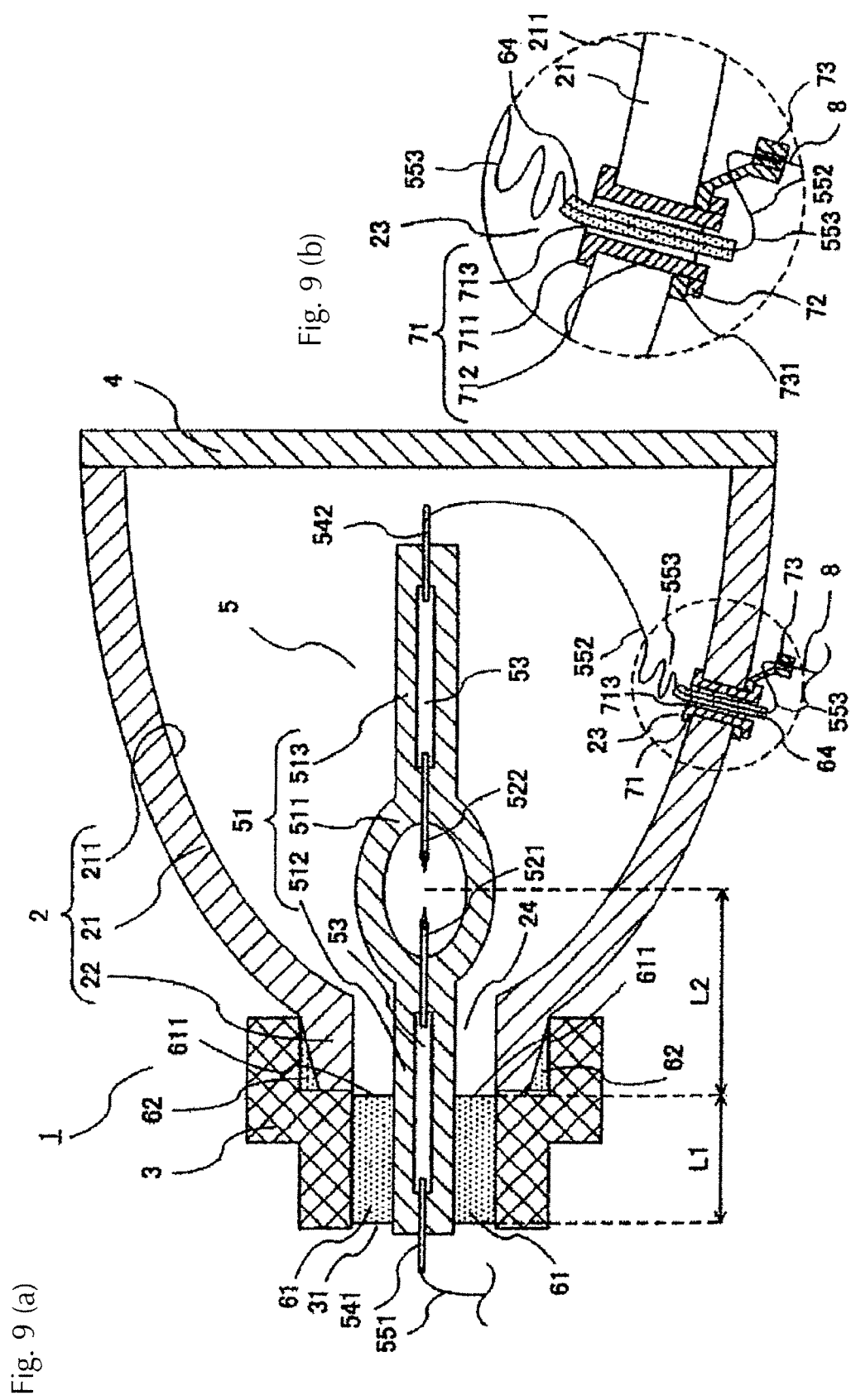
FIGS. 9(a)-9(b) are diagrams of a light source device relating to a further embodiment of the present invention.
Figure 10:
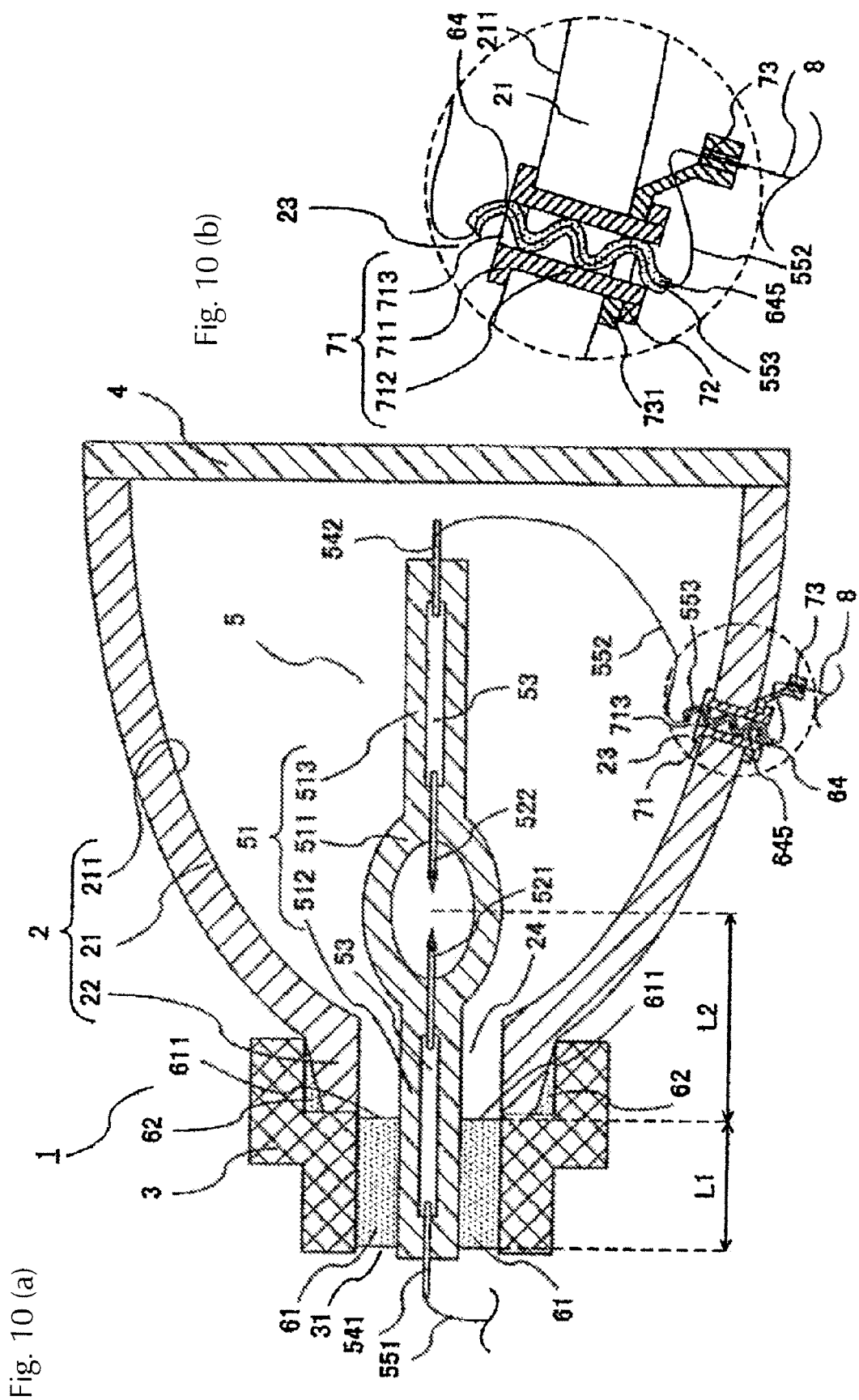
FIGS. 10(a)-10(b) are diagrams of a light source device relating to a further embodiment of the present invention.

FIGS. 9(a)-9(b) and FIGS. 10(a)-10(b) are diagrams of the light source device 1 according to a further embodiment. FIG. 9(a) is a cross sectional view along the pair of electrodes 521, 522 of the high-pressure mercury lamp 5. FIG. 9(b) is an enlarged view of the periphery of the opening 23 of the light source device shown in FIG. 9(a). FIG. 10(b) is an enlarged view of the periphery of the opening 23 of the light source device 1 in FIG. 10(a). The light source device 1 of FIGS. 9(a)-9(b) and FIGS. 10(a)-10(b) operates in a similar manner as that of FIG. 7 and FIGS. 8(a)-8(b) and accordingly only the differences therebetween will be further described for the sake of brevity.

Specifically, the light source device 1 shown in FIGS. 9(a)-9(b) includes a portion at the side of the second external lead 542 that is bent relative to the opening 713 of the rimmed metal tube 71 in the feed wire 552. The light source device 1 shown in FIGS. 10(a)-10(b) includes the flexible tube 64 and the feed wire 552 coated with the tube 64 with both being bent.

As in FIG. 7, if the flexible tube 64 is provided in the portion surrounded by the reflecting surface 211 in the feed wire 552, irradiating light from the high-pressure mercury lamp 5 or reflected light from the reflecting surface 211 can be blocked. Accordingly, in the feed wire 552, it is preferable to establish the flexible tube 64 in a portion positioned between the opening 23 of the reflecting mirror 2 (i.e., the opening 713 of the rimmed metal tube 71) and the feed wire 552. It is also effective to establish the flexible tube 64 at a desired position via heat-shrinking tube or by means of an adhesive. In addition, it is also effective to establish the flexible tube 64 by winding a film-state member to a desired position and with a securing means at both ends such as with an adhesive.

Because the flexible tube 64 can have adhesive characteristics, it can be provided at a portion positioned between the opening 23 of the reflecting mirror 2 (i.e., the opening 713 of the rimmed metal tube 71) and the feed wire 552. In FIGS. 9(a)-9(b), bend sections 553, where the feed wire 552 is bent at the sides of the second external lead 542 and the metal terminal 73 relative to the opening 713 of the metal tube 71, are provided. Advantageously, a movement of the flexible tube 64 interposed between the rimmed metal tube 71 and the feed wire 552 is restrained between the bend sections 553, by being sandwiched between the bend sections 553. With this design, the flexible tube 64 can be established so as to be interposed between the rimmed metal tube 71 and the feed wire 552.

In addition, since the feed wire 552 is made of a metal wire, such as nickel (Ni), and it can be easily bent, and the flexible tube 64 can be arranged at a desired position. Accordingly, in the light source device 1 shown in FIGS. 9(a)-9(b), irradiating light from the high-pressure mercury lamp 5 or reflected light from the reflecting surface can be blocked by the flexible tube 64.

The feed wire 552 is made of a metal wire, such as nickel (Ni), and it can be easily bent. The flexible tube 64 is formed from a material, such as fluorine resin, silicon resin, polyimide resin and epoxy resin, and these members have flexibility. Accordingly, as shown in FIGS. 10(a)-10(b), the flexible tube 64 can be bent along with the feed wire 552. Advantageously, the flexible tube 64 can be provided so as to always be interposed between the rimmed metal tube 71 and the feed wire 552. In addition, since the flexible tube 64 can be arranged at a desired position, irradiating light from the high-pressure mercury lamp 5 or reflected light from the reflecting surface 211 can be prevented via blocking by the flexible tube 64.

Figure 11:
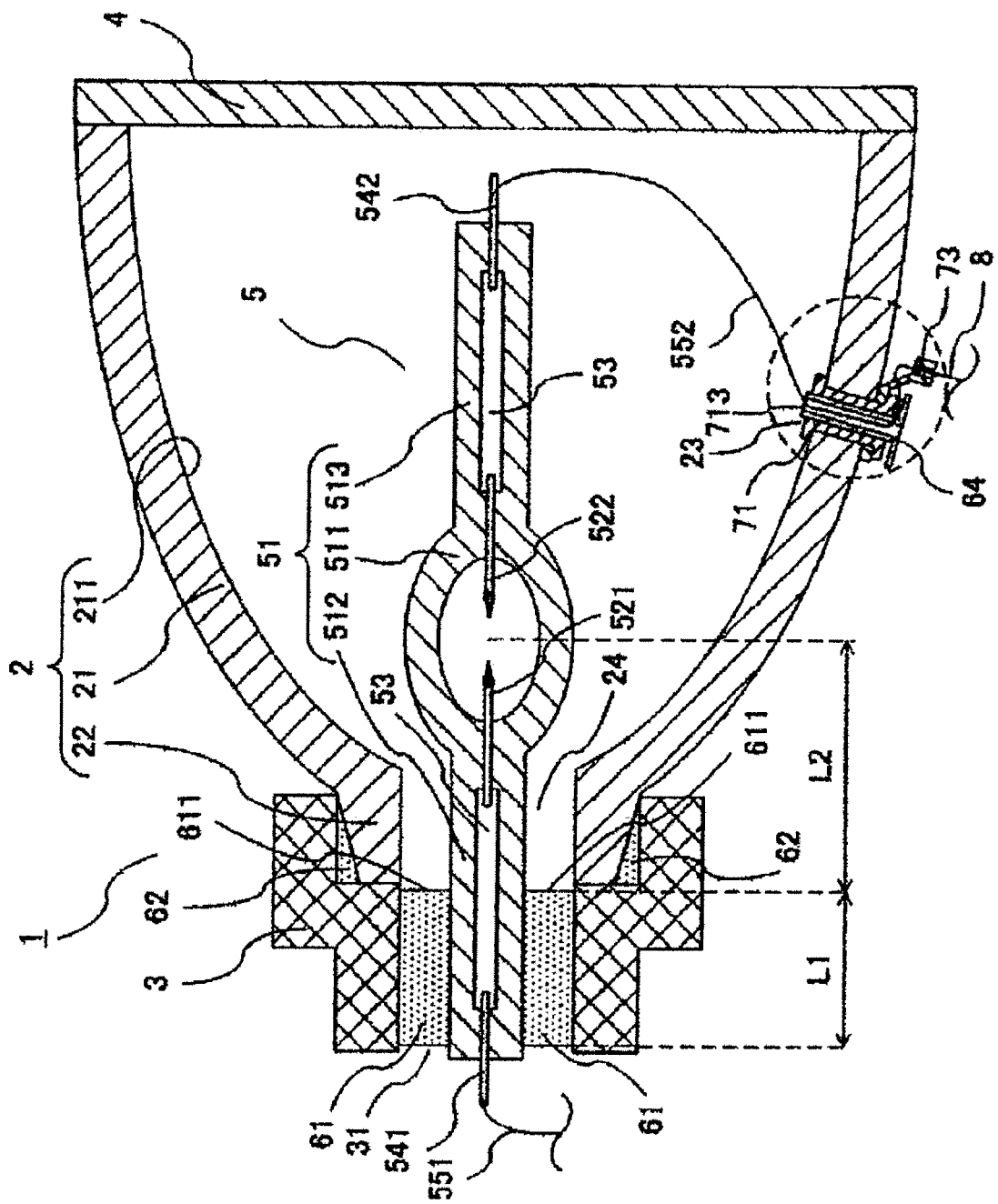
FIG. 11 is a diagram of a light source device relating to a further embodiment of the present invention.
Figure 12:
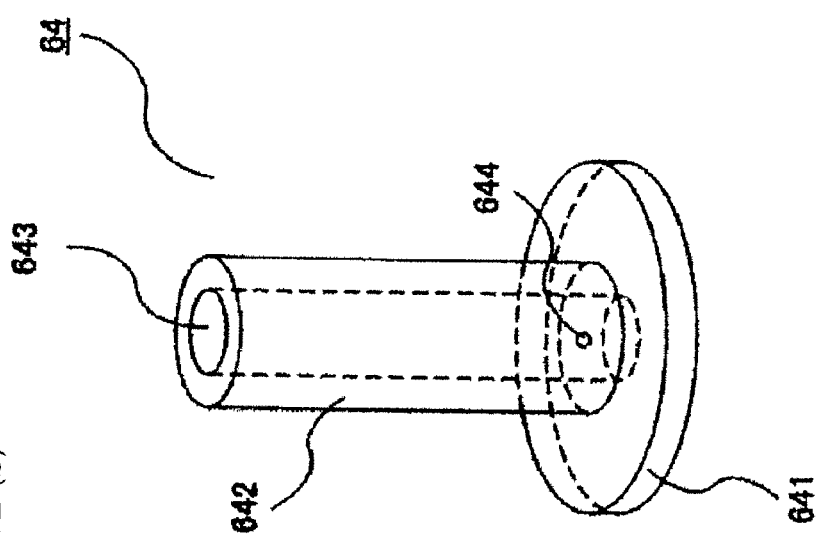
FIGS. 12(a)-12(b) are diagrams of a light source device relating to a further embodiment of the present invention.
Figure 12:
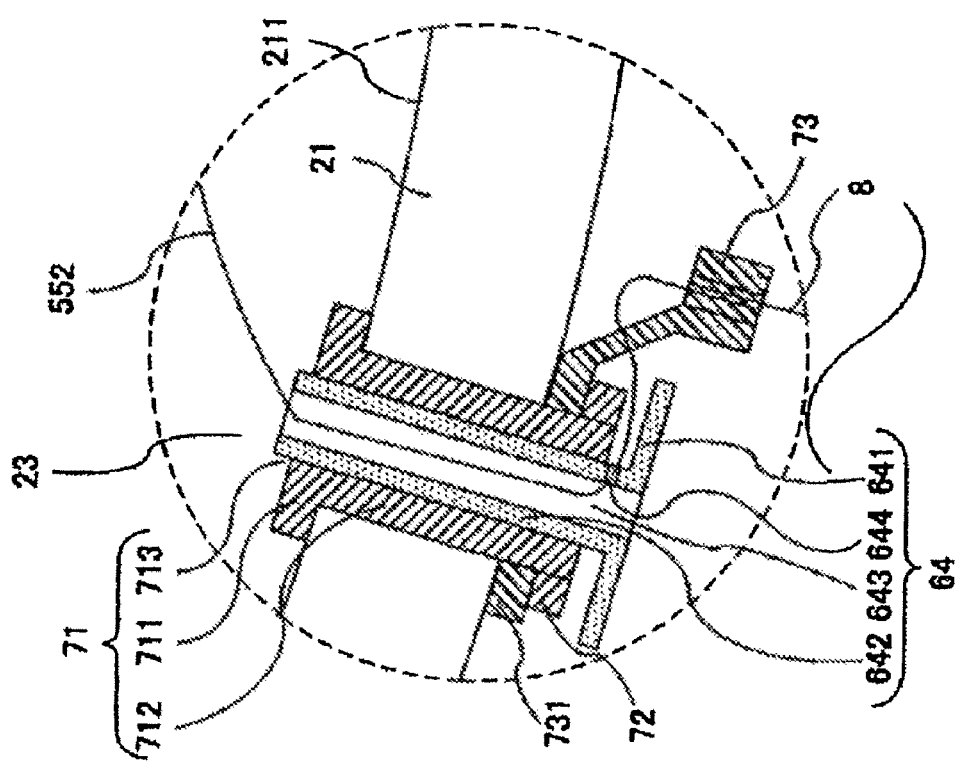

FIG. 11 and FIGS. 12(*a*)-12(*b*) are diagrams of the light source device 1 according to another embodiment. FIG. 11 is a cross sectional view along the pair of electrodes 521, 522 of the high-pressure mercury lamp 5. FIG. 12(*a*) is an enlarged view of the periphery of the opening 23 of the light source device 1 in FIG. 11. FIG. 12(*b*) is an enlarged view of the flexible tube 64 shown in FIGS. 10(*a*)-10(*b*). The light source device 1 of FIG. 11 and FIGS. 12(*a*)-12(*b*) operates in a similar manner as that of FIG. 7 and FIGS. 8(*a*)-8(*b*) and accordingly only the differences therebetween will be further described for the sake of brevity.

Specifically, the flexible tube 64 is arranged at the side of the rimmed metal tube or grommet 71. In addition, the flexible tube 64 is formed with a cylindrical member, wherein a rim 641 is established at one end thereof, as shown in FIG. 12(*b*). As shown in FIG. 12(*a*), a cylindrical tube 642 is established so as to come into contact with the inner circumferential surface of the opening 713 of the rimmed metal tube 71. A small hole 644 where the feed wire 552 is inserted is provided in the cylindrical tube 642. The small hole 644 is provided at the opposite side from the reflecting surface 211 of the reflecting mirror 2 in the tube 642 penetrating through the opening 713 of the rimmed metal tube 71. With this design, the feed wire 552 extending from the second external lead 542 passes through the hole 643 penetrating the central axis of the flexible tube 64, and next, passes through the small hole 644 provided in the tube 642 and inserted into the metal terminal 73. The feed wire 552 and the feed wire 8 extending from the power source (not shown) are electrically connected directly or via the metal terminal 73, by inserting the feed wire 8 extending from the power source and crimping the metal terminal 73.

Movement of the flexible tube 64 is restrained by the feed wire 552 passing through the small hole 644, by inserting the feed wire 552 into the small hole 644 provided in the tube 642 of the flexible tube 64. Accordingly, as shown in FIG. 12(*a*), the flexible tube 64 can be always interposed between the rimmed metal tube 71 and the opening 713.

The flexible tube 64 makes contact with the reflecting mirror 2 at the time of operating the lamp 5 by alternating current, by interposing the flexible tube 64 between the opening 23 and the feed wire 552. At the time of turning on the lamp 5, even if the vibrations of the second hermetically sealed part 513 of the high-pressure mercury lamp 5 are transmitted to the feed wire 552, because the tube 64 has flexibility, the vibrations are absorbed, and the transmission of the vibrations to the reflecting mirror 2 can be controlled. The flexible tube 64 can be made from a material, such as fluorine resin, silicon resin, polyimide resin and epoxy resin, and having suitable heat resistance, and which can withstand heat radiated from the high-pressure mercury lamp 5.

As shown in FIG. 12(*a*), even though there is a gap between the reflecting mirror 2 and the flexible tube 64, and the flexible tube 64 abrades against the reflecting mirror 2, if the flexible tube 64 is, for example, made from a material with a small coefficient of friction, such as fluorine resin, the friction between the reflecting mirror 2 and this flexible tube 64 becomes smaller, and the generation of a noise can be further prevented. In addition, even if the gap between the feed wire 552 and the reflecting mirror 2 situated in the radial direction is tightly filled by the flexible tube 64, and the reflecting mirror 2 and the flexible tube 64 are closely attached so as not to abrade the feed wire 552 against the reflecting mirror 2, the vibrations of the feed wire 552 of the high-pressure mercury lamp 5 can be absorbed by the flexibility of the tube 64. Further, providing the rim 641 on the flexible tube 64 prevents the tube 642 from falling off from the opposite side from the reflecting surface 211 of the reflecting mirror 2 through the side of reflecting surface 211 when the flexible tube 64 is inserted into the opening 713 of the rimmed metal tube 71, and makes assembly easier. Moreover, providing the rim 641 at the opposite side from the reflecting surface 211 in the reflecting mirror 2 prevents shielding of the reflecting surface 211 by the rim 641.

As a means to establish the flexible tube 64 at the side of the opening 23 of the reflecting mirror 2 (i.e., the opening 713 of the rimmed metal tube 71), the tube 64 can be provided by coating and drying the opening 713 of the rimmed metal tube 71 with an adhesive.

The light source devices 1 shown in FIGS. 7-12 can be incorporated into projector device (not shown), wherein the feed wire 552 and the feed wire 8 extend from the power source (not shown) and are crimped by the metal terminal 73. The feed wire 8 extending from the power source and crimped by the metal terminal 73 is pulled and the metal terminal 73 and the fixture 731 extending from the metal terminal 73 can be rotated relative to the reflecting mirror 2. In addition, associated with such rotation, the rimmed metal tube or grommet 71 and/or the washer 72 supporting the fixture 731 of the metal terminal 73 can be rotated. In order to prevent such rotation, replacing the washer 72 shown in FIGS. 7-12 with a tooth lock washer (also referred to as a lock washer or a tooth washer), wherein multiple protrusions toward the surface at the fixture 731 side of the metal terminal 73 enables locking pressure onto the fixture 731 of the metal terminal toward the reflecting mirror 2, such that the coefficient of friction against the fixture 731 of the metal terminal can be increased, and the rotation of the fixture 731 of the metal terminal can be prevented. Further, since the rimmed metal tube 71 for supporting the fixture 731 of the metal terminal 73 and the washer 72 can also be locked, the rotation of these parts also can be prevented.

Besides replacing the washer 72 with a tooth lock washer, an anti-rotation washer for the purpose of preventing rotation can be provided between the rim 711 of the rimmed metal tube 71 (i.e., the surface of the rim 711 at the side of the reflecting mirror 2) and the reflecting mirror 2 (i.e., the reflecting surface 211 of the reflecting mirror 2, not shown in FIG. 7 to FIG. 12). As such an anti-rotation washer, the above-mentioned tooth lock washer can be used, or a washer having a spring property that can apply pressure toward the central axis direction of a hole, such as a spring washer that is roughly C-shaped having a hole in the center, and that is twisted in the central axis direction of the hole (also referred to as a spring washer) or a waveform washer (also referred to as a wave washer) that is slightly deformed toward the central axis direction of the hole can be employed. In the case of the spring washer or the waveform washer, the tube 712 of the rimmed metal tube 71 is inserted into the hole, and the washer provided between the rim 711 of the rimmed metal tube 71 (i.e., surface of the rim 711 at the side of the reflecting mirror 2) and the reflecting mirror 2 (i.e., the reflecting surface 211 of the reflecting mirror 2) exerts pressure on the rim 711 of the rimmed metal tube 71 and the reflecting mirror 2, toward the central axis direction of the tube 712 of the metal tube 71 with a rim 71, and the rotation of the rimmed metal tube 71 can be prevented. Similarly, the rotation of the washer 72 secured to the end of the tube 812 of the rimmed metal tube 71 and the fixture 731 of the metal terminal 73 that comes into contact with the washer 72 can be prevented.

In order to show the advantages of the light source device 1 relating to the present invention, the following experiments were conducted. The configuration of the light source device 1 used for the experiment is the same as the one shown in FIGS. 1(a)-1(b). The reflecting mirror 2 used for the experiment is made of borosilicate glass, and a dielectric multilayer film made of silica ($SiO_2$) and titania ($TiO_2$) are provided as the reflecting surface 211. The base member 3 made of ceramics is arranged at the end of the neck 22 of the reflecting mirror 2. Eight types of high-pressure mercury lamps 5 used for the experiment were prepared having a discharge tube 51 formed with quartz glass, and the electrodes 521, 522 made of tungsten included within the light-emitting part 511 of the discharge tube 51. The foils 53 made of molybdenum are embedded in the hermetically sealed parts 512, 513 of the discharge tube 51, and the external leads 541 and 542 made of molybdenum are made to protrude from the ends of the hermetically sealed parts 512 and 613 of the discharge tube 51. In addition, the feed wires 551, 552 being electrically connected to the external leads 541 and 542 are made of nickel.

The common specifications of the eight types of the lamps 5 are such that the inner volume of the light-emitting part 511 is 80 $mm^3$, the distance between the electrodes 521, 522 included into the light-emitting part 511 is 1.2 mm, the amount of mercury included in the light-emitting part 511 is 280 $mg/mm^3$, and argon gas is 13 kPa. In addition, the rated voltage is 80 V and the rated power is 270 W.

The same reflecting mirror and the same base member were used for the eight types of lamps 5. Each lamp 5 is secured to the base member 3 by the inorganic adhesive 61. The eight types of light source devices 1 equipped with the high-pressure mercury lamp 5 are referred to as A to H, and each specification of the light sources devices A to H will be described.

As shown in FIG. 1(a), the length of the adhesive 61 filled between the outer circumference of the first hermetically sealed part 512 and the inner circumference of the base member 3 in the direction where the hermetically sealed parts 512, 513 extend (i.e., the central axis direction) is given as L1. As shown in FIG. 1(b), the diameter of the first hermetically sealed part 512 of the high-pressure mercury lamp 5 is given as R.

In the light source devices A-H, the length L1 filled with the adhesive 61 between the outer circumference of the first hermetically sealed part 512 and the inner circumference of the base member 3 is 7 mm. In the light source devices A, the diameter R of the first hermetically sealed part 512 is ø=5.8 mm, and the length L2 from the center between the electrodes 521, 522 to the end surface 611 of the adhesive 61 at the side of the light-emitting part 511 is 14 mm. In the light source device B, the diameter R of the first hermetically sealed part 512 is ø=5.8 mm, and the length L2 from the center between the electrodes 521, 522 to the end surface 611 of the adhesive 61 at the side of the light-emitting part 511 is 16 mm. In the light source device C, the diameter R of the first hermetically sealed part 512 is ø=5.8 mm, and the length L2 from the center between the electrodes 521, 522 to the end surface 611 of the adhesive 61 at the side of the light-emitting part 511 is 17 mm. In the light source device D, the diameter R of the first hermetically sealed part 512 is ø=5.8 mm, and the length L2 from the center between the electrodes 521, 522 to the end surface 611 of the adhesive 61 at the side of the light-emitting part 511 is 18 mm. In the light source device E, the diameter R of the first hermetically sealed part 512 is ø=5.8 mm, and the length L2 from the center between the electrodes 521, 522 to the end surface 611 of the adhesive 61 at the side of the light-emitting part 511 is 20 mm.

In the light source device F, the length L1 where the adhesive 61 is filled is 9 mm and the diameter R of the first hermetically sealed part 512 is ø=10 mm, and the length L2 from the center between the electrodes 521, 522 to the end surface 611 of the adhesive 61 at the side of the light-emitting part 511 is 16 mm. In the light source device G, the length L1 where the adhesive 61 is filled is 13 mm and the diameter R of the first hermetically sealed part 512 is ø=6.4 mm, and the length L2 from the center between the electrodes 521, 522 to the end surface 611 of the adhesive 61 at the side of the light-emitting part 511 is 18 mm. In the light source device H, the length L1 where the adhesive 61 is filled is 5 mm and the diameter R of the first hermetically sealed part 512 is ø=10 mm, and the length L2 from the center between the electrodes 521, 522 to the end surface 611 of the adhesive 61 at the side of the light-emitting part 511 is 20 mm.

At the time of turning on the lamp 5, alternating current with 370 Hz of frequency is employed. For the experiment, a noise measurement microphone is arranged in the vicinity of the reflecting mirror 2, and the peak frequency after 20 seconds from the start of turning on each of the lamps 5 in the light source device A to H is measured, respectively.

Figure 13:
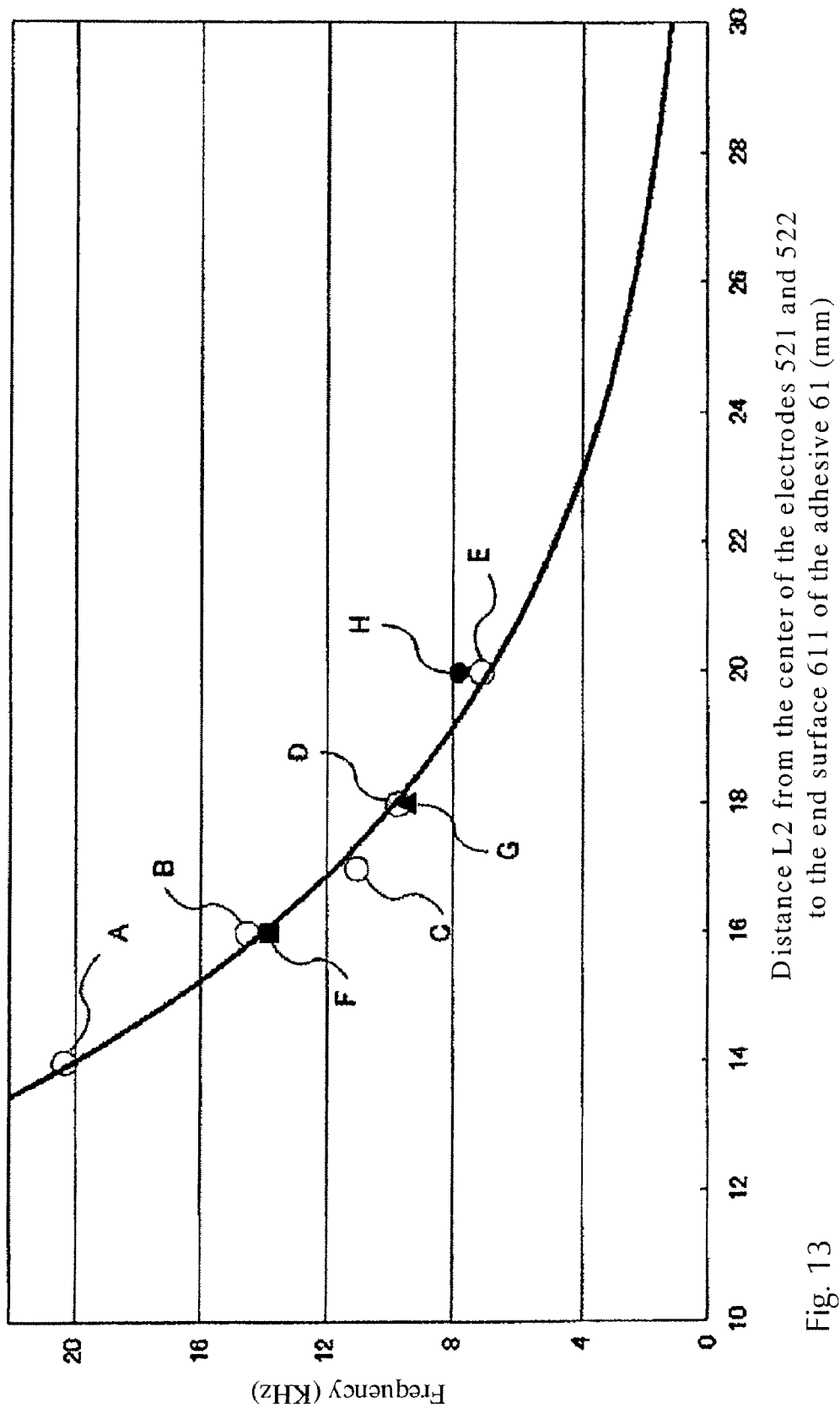
FIG. 13 shows experimental results of a light source device relating to the present invention.

Measurement results of the light sources A to H are shown in FIG. 13. In FIG. 13, the horizontal axis indicates the distance L2 (mm) from the center between the electrodes 521, 522 to the end surface 611 of the adhesive 61 filled between the outer circumference of the first hermetically sealed part 512 and the inner circumference of the base member 3 at the side of the light-emitting part 511, and the vertical axis indicates frequency (kHz). In FIG. 13, the peak frequencies of the light source devices A to H are plotted. In addition, in FIG. 13, according to the measurement results of the light source devices A to H, whose length L1 where the adhesive 61 is filled is 7 mm, an approximate curve is drawn.

Figure 15:
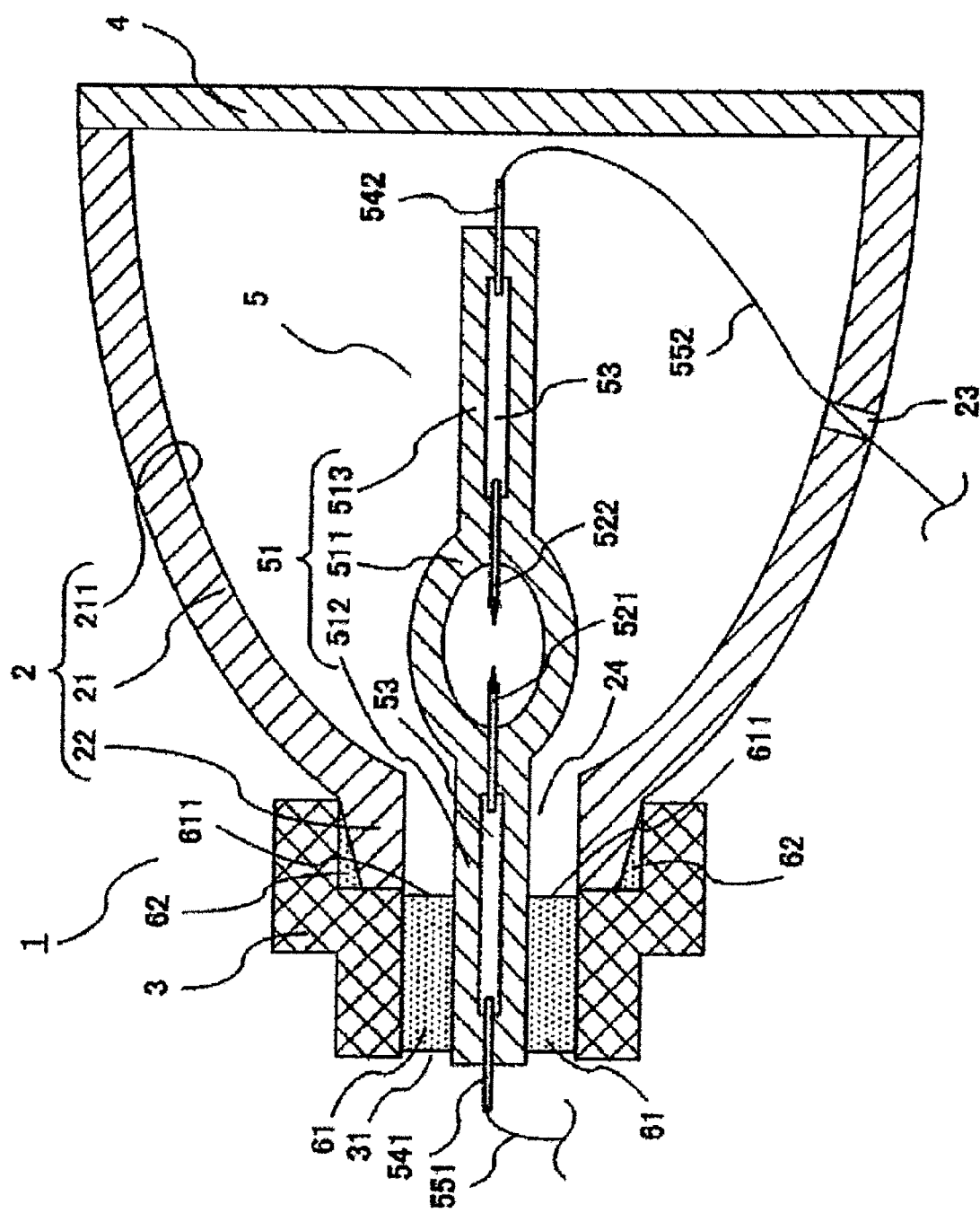
FIG. 15 shows a light source device relating to the prior art.

As a result of confirming noises at 8 to 12 kHz of frequencies by ten collaborators of the experiment, the ten collaborators perceived undesirable noise. As shown in FIG. 13, regarding the light source devices B to F, whose length L2 from the center between the electrodes 521, 522 to the adhesive 61 is 16 mm, the peak frequency is approximately 14 kHz, and regarding the light source devices E and H, whose length L2 from the center between the electrodes 521, 522 to the adhesive 61 is 20 mm, the peak frequency is approximately 7 kHz to 8 kHz. As a result of confirming noises at these frequencies by the ten collaborators of the experiment, nine found the noise undesirable. In particular, regarding the light source device A, whose length L2 from the center between the electrodes 521, 522 to the adhesive 61 is 14 mm, the peak frequency is approximately 20 kHz as shown in FIG. 15, and as a result of confirming noises at these frequencies by the ten collaborators of the experiment, all ten collaborators did not find the noise undesirable, and as the frequency at 20 kHz typically cannot be perceived by humans.

As described above, it was ascertained that if the distance L2 from the center between the electrodes 521, 522 to the adhesive 61 is adjusted to 16 mm or less or 20 mm or greater in the direction of a pair of the electrodes 521, 522, it makes the noise from the light source device 1 difficult for humans to perceive as an undesirable noise. In particular, it was ascertained that if the distance L2 from the center between the electrodes 521, 522 to the adhesive 61 is adjusted to 14 mm or less in the direction of the pair of electrodes 521, 522, the noise from the light source device 1 becomes audible to humans.

Advantages of noise control by filling the adhesive 61 between the opening 23 and the feed wire 552 or by establishing the flexible tube 64 were confirmed using the light source device 1. The light source device 1 is shown in FIG. 1, and including the reflecting mirror 2 made of borosilicate glass, and a dielectric multilayer film made of silica ($SiO_2$) and titania ($TiO_2$) provided as the reflecting surface 211. The base member 3 made of ceramics is arranged at the end of the neck 22 of the reflecting mirror 2.

In the high-pressure mercury lamp 5 of the light source device 1, the discharge tube 51 is formed with quartz glass, and the electrodes 521, 522 are made of tungsten and included within the light-emitting part 511 of the discharge tube 51. The foils 53 made of molybdenum are embedded in the hermetically sealed parts 512, 513 of the discharge tube 51, and the external leads 541 and 542 made of molybdenum are made to protrude from the ends of the hermetically sealed parts 512 and 513 of the discharge tube 51. In addition, the feed wires 551 and 552 being electrically connected to the external leads 541, 542 are made of nickel.

The common specifications of the eight types of lamps 5 are such that the inner volume of the light-emitting part 511 is 80 mm$^3$, the distance between the electrodes 521, 522 included into the light-emitting part 511 is 1.2 mm, the amount of mercury included in the light-emitting part 511 is 280 mg/mm$^3$, and argon gas is 13 kPa. In addition, the rated voltage is 80 V and the rated power is 270 W.

The length L1 filled with the adhesive 61 between the outer circumference of the first hermetically sealed part 512 and the inner circumference of the base member 3 is 7 mm. In the direction where the hermetically sealed parts 512, 513 extend (i.e., the central axis direction), the components are arranged so as to adjust the distance L2 from the center between the electrodes 521, 522 to the end surface 611 of the adhesive 61 filled between the outer circumference of the first hermetically sealed part 512 and the inner circumference of the base member 4 at the side of the light emitting part 511 to be 20 mm. The high-pressure mercury lamp 5 is secured to the base member 3 by the inorganic adhesive 61.

The light source device 1 with the inorganic adhesive 61 that fills the opening 23 of the light source device I, and the second feed wire 552, as shown in FIG. 4, is referred to as J. The light source device 1 with the flexible tube 64 made of fluorine resin in the opening 23 of the light source device I, wherein the abrasion of the second feed wire 552 against the reflecting mirror 2 is prevented is referred to as K.

At the time of turning on the lamp 5, alternating current at 370 Hz of frequency is employed. In the experiment, a noise measurement microphone is arranged in the vicinity of the reflecting mirror 2, and the peak frequency after 20 seconds, 60 seconds, 120 seconds, 180 seconds and 240 seconds after turning on each of the lamps 5 in the above-mentioned light source devices I to K is measured.

Figure 14:
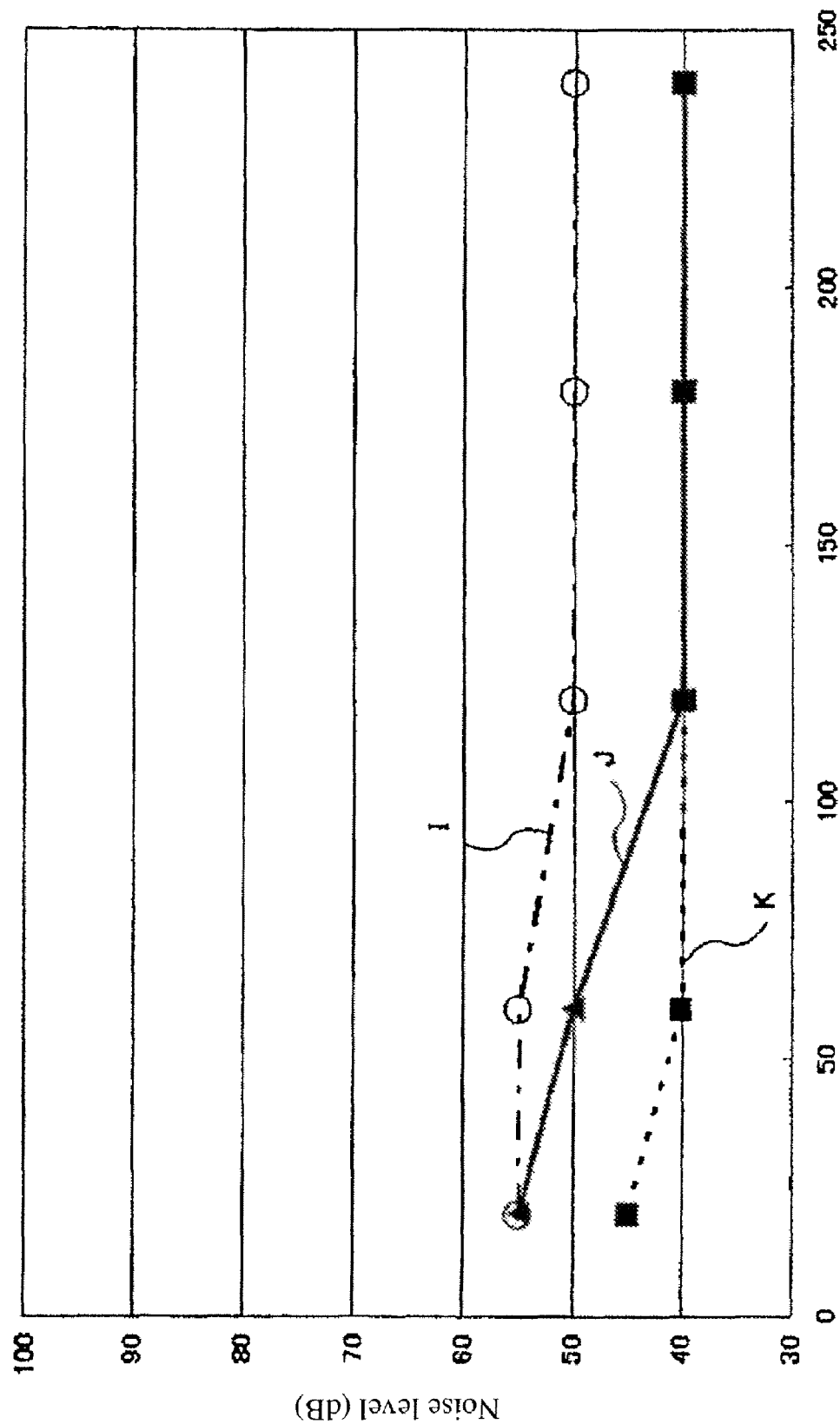
FIG. 14 shows further experimental results of a light source device relating to the present invention.

Measurement results of the light source devices I to K are shown in FIG. 14. In FIG. 14, the horizontal axis indicates a duration (sec) after turning on the lamp 5 and the vertical axis indicates a noise level (dB). In FIG. 14, the noise level (dB) for each duration (sec) of the light source devices I to K are plotted, and the plots are connected with a line, respectively. As shown in FIG. 14, the noises from the light source devices J and K are reduced by 20 dB, as compared to the noises from the light source device I, after the passage of 120 seconds from the start of turning on of the lamp 5. In particular, the light source device K further controls the volume immediately after the start of the turning on of the lamp 5 via alternating current.

What is claimed is:

1. A light source device, comprising:
   an alternating current high-pressure mercury lamp having a pair of electrodes internally arranged opposite each other;
   a light-emitting part having at least 0.15 mg/mm$^3$ of mercury, a halogen within a range of $10^{-6}$ μmol/mm$^3$ to $10^{-2}$ μmol/mm$^3$, and hermetically sealed parts extending from both ends of the light-emitting part;
   a reflecting mirror comprising a concave reflecting part arranged so as to surround the light-emitting part, and a cylindrical neck part; and
   an adhesive for securing the mercury lamp and the reflecting mirror by filling a periphery of the hermetically sealed parts of the mercury lamp,
   wherein a distance L2 (mm) from a center in between the electrodes to the adhesive is set at a value of one of 16 mm or less and 20 mm or greater.

2. The device of claim 1, wherein the adhesive fills in a space in the neck part of the reflecting mirror.

3. The device of claim 1, wherein a cylindrical base member is linked to the neck part of the reflecting mirror, and the adhesive fills in a space between the neck part and the base member.

4. The device of claim 1, wherein an opening for a feed wire is formed in a reflecting part of the reflecting mirror.

5. The device of claim 4, wherein the adhesive fills in the opening.

6. The device of claim 4, wherein a flexible tube is interposed between the opening and the feed wire.

7. The device of claim 6, wherein a metal tube is provided between the opening and the flexible tube.

* * * * *